United States Patent
Kang et al.

(10) Patent No.: US 11,817,858 B2
(45) Date of Patent: Nov. 14, 2023

(54) APPARATUS FOR LOW POWER TERNARY LOGIC CIRCUIT

(71) Applicant: POSTECH Research and Business Development Foundation, Pohang-si (KR)

(72) Inventors: Seokhyeong Kang, Pohang-si (KR); Sunghye Park, Daegu (KR); SungYun Lee, Busan (KR); Sunmean Kim, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 205 days.

(21) Appl. No.: 17/175,570

(22) Filed: Feb. 12, 2021

(65) Prior Publication Data

US 2022/0109444 A1     Apr. 7, 2022

(30) Foreign Application Priority Data

Oct. 6, 2020 (KR) .......................... 10-2020-0129024

(51) Int. Cl.
*H03K 19/00* (2006.01)
*H10K 10/46* (2023.01)
*G06F 119/06* (2020.01)

(52) U.S. Cl.
CPC ....... *H03K 19/0013* (2013.01); *H10K 10/462* (2023.02); *G06F 2119/06* (2020.01)

(58) Field of Classification Search
None
See application file for complete search history.

(56) References Cited

U.S. PATENT DOCUMENTS

2019/0341100 A1* 11/2019 Li .......................... G11C 11/412

FOREIGN PATENT DOCUMENTS

CN     103618542 A   *   3/2014

OTHER PUBLICATIONS

Mokhtar et al., Design of a Low-Standby Power and High-Speed Ternary Memory Cell Based on Carbon Nanotube Field-Effect Transistor, 2015, Journal of Computational and Theoretical Nanoscience, vol. 12, pp. 5457-5462. (Year: 2015).*
P. S. Peercy, "The drive to miniaturization," Nature, vol. 406, No. 6799, pp. 1023-1026, Aug. 2000.
(Continued)

*Primary Examiner* — Anh Q Tran
(74) *Attorney, Agent, or Firm* — Morgan, Lewis & Bockius LLP

(57) ABSTRACT

A static ternary gate is disclosed. The static ternary gate includes a drain-ground path configured to output a drain voltage through a first transistor when a first pull-up circuit is turned on, and output a ground voltage through a second transistor when a first pull-down circuit is turned on, a half-drain path configured to output a half-drain voltage through the first transistor and the second transistor when both a second pull-up circuit and a second pull-down circuit are turned on. The first transistor is configured to connect a node between the first pull-up circuit and the second pull-down circuit to an output terminal, and the second transistor is configured to connect a node between the second pull-up circuit and the first pull-down circuit to the output terminal.

12 Claims, 21 Drawing Sheets

(56) References Cited

OTHER PUBLICATIONS

R. Ho, K. W. Mai, and M. A. Horowitz, "The future of wires," Proc. IEEE, vol. 89, No. 4, pp. 490-504, Jul. 2001.
G. Yeap, "Smart mobile SoCs driving the semiconductor industry: Technology trend, challenges and opportunities," in IEDM Tech. Dig., Dec. 2013. pp. 1.3.1-1.3.8.
N. Magen, A. Kolodny, U. Weiser, and N. Shamir, "Interconnect-power dissipation in a microprocessor," in Proc. Int. workshop Syst. Level Interconnect Predict., 2004, pp. 7-13.
Y. Taur, "CMOS design near the limit of scaling," IBM J. Res. Develop., vol. 46, No. 2.3, pp. 213-222, Mar. 2002.
S. Iijima and T. Ichihashi, "Single-shell carbon nanotubes of 1-nm diameter," Nature, vol. 363, No. 6430, pp. 603-605, Jun. 1993.
R. H. Baughman, "Carbon nanotubes—The route toward applications," Science, vol. 297, No. 5582, pp. 787-792, Aug. 2002.
V. Gaudet, "A survey and tutorial on contemporary aspects of multiplevalued logic and its application to microelectronic circuits," IEEE J. Emerg. Sel. Topics Circuits Syst., vol. 6, No. 1, pp. 5-12, Mar. 2016.
L. Hurst, "Multiple-valued logic—Its status and its future," IEEE Trans. Comput., vols. C-33, No. 12, pp. 1160-1179, Dec. 1984.
K. C. Smith, "A multiple valued logic: A tutorial and appreciation," Computer, vol. 21, No. 4, pp. 17-27, Apr. 1988.
X. W. Wu and F. P. Prosser, "CMOS ternary logic circuits," IEE Proc. G Circuits, Devices Syst., vol. 137, No. 1, pp. 21-27, 1990.
A. Raychowdhury and K. Roy, "Carbon-nanotube-based voltage—mode multiple-valued logic design," IEEE Trans. Nanotechnol., vol. 4, No. 2, pp. 168-179, Mar. 2005.
Y. Kang et al., "A novel ternary multiplier based on ternary CMOS compact model," in Proc. IEEE 47th Int. Symp. Multiple-Valued Log. (ISMVL), May 2017, pp. 25-30.
S. Heo et al., "Ternary full adder using multi-threshold voltage graphene barristors," IEEE Electron Device Lett., vol. 39, No. 12, pp. 1948-1951, Dec. 2018.
H. Yoo et al., "Negative transconductance heterojunction organic transistors and their application to full-swing ternary circuits," Adv. Mater., vol. 31, No. 29, Jul. 2019, Art. No. 1808265.
L. Lee et al., "ZnO composite nanolayer with mobility edge Quantization for multi-value logic transistors," Nature Commun., vol. 10, No. 1, p. 1998, 2019.
S. Kim, S.-Y. Lee, S. Park, and S. Kang, "Design of quad-edge-triggered sequential logic circuits for ternary logic," in Proc. IEEE 49th Int. Symp. Multiple—Valued Log. (ISMVL), May 2019, pp. 37-42.
J. W. Jeong et al., "Tunnelling-based ternary metal-oxide—semiconductor technology," Nature Electron., vol. 2, No. 7, pp. 307-312, 2019.
A. Heung and H. T. Mouftah, "Depletion/enhancement CMOS for a lower power family of three-valued logic circuits," IEEE J. Solid-State Circuits, vol. 20, No. 2, pp. 609-616, Apr. 1985.
R. A. Jaber, A. Kassem, A. M. El-Hajj, L. A. El-Nimri, and A. M. Haidar, "High-performance and energy-efficient CNFETbased designs for ternary logic circuits," IEEE Access, vol. 7. pp. 93871-93886, 2019.
S. Lin, Y.-B. Kim, and F. Lombardi, "A novel CNTFET-based ternary logic gate design," in Proc. 52nd IEEE Int. Midwest Symp. Circuits Syst., Aug. 2009, pp. 435-438.
J. Deng and H.-S.-P. Wong, "A compact SPICE model for carbon—nanotube field-effect transistors including nonidealities and its application-Part I: Model of the intrinsic channel region," IEEE Trans. Electron Devices, vol. 54, No. 12, pp. 3186-3194, 2007.
J. Deng et al., "A compact SPICE model for carbon-nanotube field-effect transistors including nonidealities and its application—Part II: Full device model and circuit performance benchmarking," IEEE Trans. Electron Devices, vol. 54, No. 12 2007.
S. Lin, Y.-B. Kim, and F. Lombardi, "CNTFET-based design of ternary logic gates and arithmetic circuits," IEEE Trans. Nanotechnol., vol. 10, No. 2, pp. 217-225, Mar. 2011.
B. Srinivasu and K. Sridharan, "A synthesis methodology for ternary logic circuits in emerging device technologies," IEEE Trans. Circuits Syst. I, Reg. Papers, vol. 64, No. 8, pp. 2146-2159, Aug. 2017.
S. Kim, T. Lim, and S. Kang, "An optimal gate design for the synthesis of ternary logic circuits," in Proc. 23rd Asia South Pacific Design Autom. Conf. (ASP-DAC), Jan. 2018, pp. 476-481.
C. Vudadha, A. Surya, S. Agrawal, and M. B. Srinivas, "Synthesis of ternary logic circuits using 2:1 multiplexers," IEEE Trans. Circuits Syst. I, Reg. Papers, vol. 65, No. 12, pp. 4313-4325, Oct. 2018.
S.-Y. Lee, S. Kim, and S. Kang, "Ternary logic synthesis with modified Quine-McCluskey algorithm," in Proc. IEEE 49th Int. Symp. Multiple Valued Log. (ISMVL), May 2019, pp. 158-163.
D. M. Miller and M. A. Thornton, Multiple Valued Logic: Concepts and Representations. San Rafael, CA, USA: Morgan & Claypool, 2008.
P. Dwivedi, K. Kumar, and A. Islam, "Comparative study of subthreshold leakage in CNFET & MOSFET 32-nm technology node," in Proc. Int. Conf. Microelectron., Comput. Commun. (MicroCom), Jan. 2016, pp. 1-5.
M. H. Moaiyeri, A. Doostaregan, and K. Navi, "Design of energy efficient and robust ternary circuits for nanotechnology," IET Circuits, Devices Syst., vol. 5, No. 4, pp. 285-296, 2011.
W. V. Quine, "The problem of simplifying truth functions," Amer. Math. Monthly, vol. 59, No. 8, pp. 521-531, Oct. 1952.
M. Hawash, M. Lukac, M. Kameyama, and M. Perkowski, "Multiple valued reversible benchmarks and extensible quantum specification (XQS) format," in Proc. IEEE 43rd Int. Symp. Multiple-Valued Log., May 2013, pp. 41-46.

* cited by examiner

APPARATUS FOR LOW POWER TERNARY LOGIC CIRCUIT

STATEMENT REGARDING FOREIGN GOVERNMENT RIGHTS

This research was supported by the Nano Material Technology Development Program (2016M3A7B4909943), Creative Materials Discovery Program (2017M3D1A1040834), and Multi-Value Logic Device Integration Process and Architecture Platform Research (2019M3F3A1A01074453) through the National Research Foundation of Korea (NRF) funded by the Ministry of Science and ICT.

CROSS-REFERENCE TO RELATED APPLICATION(S)

This application claims the benefit of Korean Patent Application No. 10-2020-0129024, filed on Oct. 6, 2020, in the Korean Intellectual Property Office, the disclosure of which is incorporated herein by reference.

BACKGROUND

1. Field of the Invention

Example embodiments relate to a digital circuit, and more particularly, to a gate design using a ternary logic circuit.

2. Description of the Related Art

In recent decades, CMOS-based digital circuits have been steadily developed. However, an apparatus is expected to have a limit in terms of a size, and thus a new approach is required. A multi-valued logic, which is considered as a new approach to a logic level, solves a circuit complexity of a binary logic circuit in a fundamental direction.

In order to solve the complexity of the binary logic circuit, a ternary logic circuit has been developed, however, the ternary logic circuit has no significant advantage because a synthesis technique of the circuit is not optimized. Therefore, there is a need to develop an optimal synthesis technique for circuits using the ternary logic circuit.

SUMMARY

A static ternary gate may include a drain-ground path configured to output a drain voltage through a first transistor when a first pull-up circuit is turned on, and output a ground voltage through a second transistor when a first pull-down circuit is turned on, a half-drain path configured to output a half-drain voltage through the first transistor and the second transistor when both a second pull-up circuit and a second pull-down circuit are turned on. The first transistor may be configured to connect a node between the first pull-up circuit and the second pull-down circuit to an output terminal. The second transistor may be configured to connect a node between the second pull-up circuit and the first pull-down circuit to the output terminal.

The first pull-up circuit may be configured to connect the second pull-down circuit, a drain power supply configured to supply the drain voltage, and the first transistor. The first pull-down circuit may be configured to connect the second pull-up circuit, a ground configured to supply the ground voltage, and the second transistor.

The second pull-up circuit may be configured to connect the first pull-down circuit, a drain power supply configured to supply the drain voltage, and the second transistor. The second pull-down circuit may be configured to connect the first pull-up circuit, a ground configured to supply the ground voltage, and the first transistor.

The first pull-up circuit and the second pull-up circuit may include a transistor having a same doping type as that of the first transistor. The first pull-down circuit and the second pull-down circuit may include a transistor having a same doping type as that of the second transistor. The first transistor and the second transistor may have opposite doping types.

The first transistor may be a p-type transistor. The second transistor may be an n-type transistor.

The first transistor and the second transistor may be a single-walled carbon nanotube field effect transistor (CNT-FET).

The first pull-up circuit, the first pull-down circuit, the second pull-down circuit, and the second pull-down circuit may include a transistor having a first threshold voltage less than a half-drain voltage and a transistor having a second threshold voltage greater than or equal to the half-drain voltage. The first transistor and the second transistor may be transistors having a third threshold voltage between the first threshold voltage and the second threshold voltage.

When both the second pull-up circuit and the second pull-down circuit are turned on and the output terminal outputs a half-drain accordingly, both the first transistor and the second transistor may be turned off to maintain an output of a half-drain voltage.

When the output voltage decreases from a drain voltage to a half-drain voltage, the second pull-down circuit may be turned on, so that a voltage of the first node may be transitioned from a drain voltage to a ground voltage, and the first transistor connected to the first node may maintain an output voltage to be at a half-drain voltage.

When a voltage of the output terminal increases from a ground voltage to a half-drain voltage, the second pull-up circuit may be turned on, so that a voltage of the second node may be transitioned from a ground voltage to a drain voltage, and the second transistor connected to the second node may maintain an output voltage to be at a drain voltage.

When the output voltage decreases from a drain voltage to a half-drain voltage, the first transistor may be turned off when a voltage of the first node becomes less than or equal to a threshold voltage.

When the voltage of the output terminal increases from the ground voltage to the half-drain voltage, the second transistor may be turned off when the voltage of the second node becomes greater than or equal to a voltage obtained by subtracting a threshold voltage from the drain voltage.

A body of the first transistor may be connected to a drain power supply configured to supply a drain voltage. A body of the second transistor may be connected to a ground configured to supply a ground voltage.

The static ternary gate may further include an external power supply connected to the output terminal. In response to a decrease in a voltage of the output terminal caused by the external power supply, a first current flowing through the first transistor may decrease and a second current flowing through the second transistor may increase. In response to an increase in the voltage of the output terminal caused by the external power supply, the first current flowing through the first transistor may increase and the second current flowing through the second transistor may decrease.

A method for designing a static ternary gate may include generating a switching table for a circuit by using a truth table corresponding to a ternary logic, converting the switching table into a sum of products expression, minimizing the switching table converted into the sum of products expression by using a Quine-McCluskey algorithm, and selecting and controlling a transistor corresponding to a given signal based on the switching table. The circuit may include a first pull-up circuit configured to output a drain voltage when turned on, a first pull-down circuit configured to output a ground voltage when turned on, a second pull-up circuit configured to output a half-drain voltage when turned on together with the second pull-down circuit, a first transistor configured to connect a node between the first pull-up circuit and the second pull-down circuit to an output terminal, and a second transistor configured to connect a node between the second pull-up circuit and the first pull-down circuit to the output terminal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
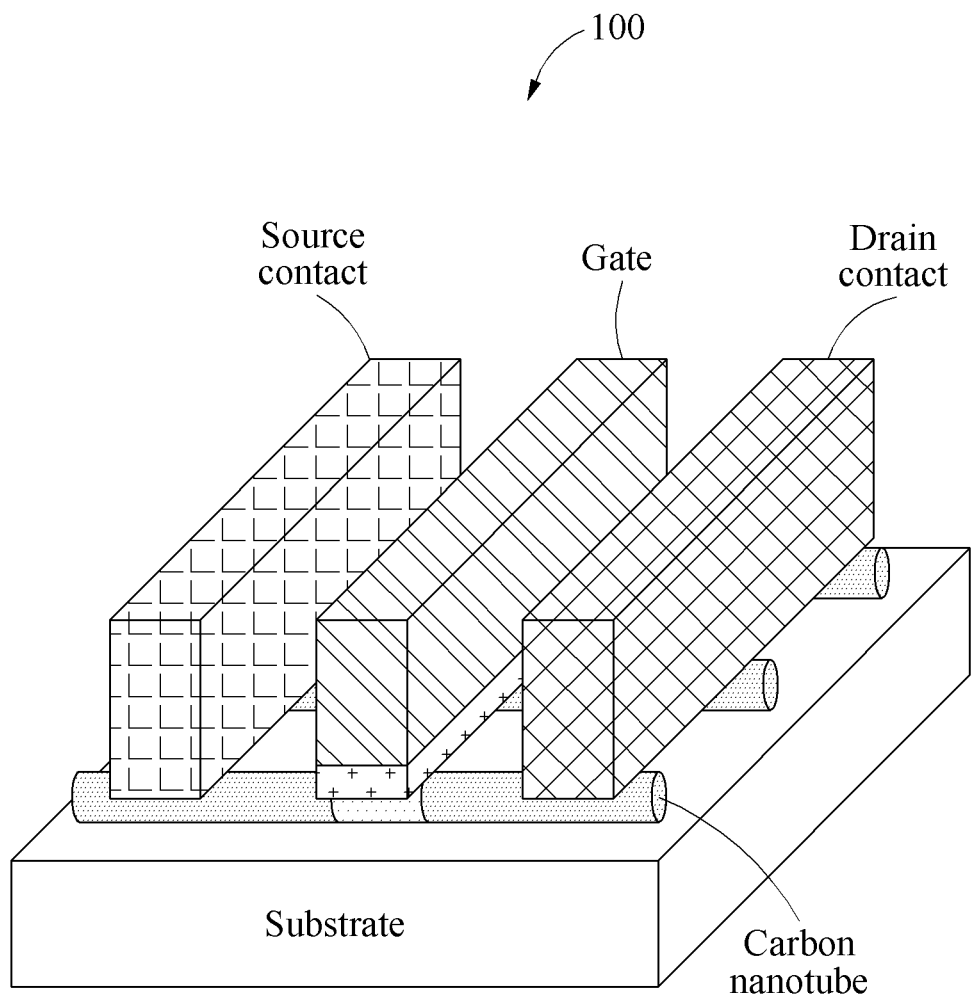
FIG. 1 is a structural diagram illustrating a single-walled carbon nanotube field effect transistor (CNTFET)

The following structural or functional descriptions are exemplary to merely describe example embodiments, and the scope of the example embodiments is not limited to the descriptions provided in the present specification. Various changes and modifications can be made to the example embodiments by one skilled in the art.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein. Hereinafter, example embodiments are described in detail with reference to the accompanying drawings. The same reference numerals in each drawing indicate the same members.

Logic Synthesis and Ternary Circuit

Logic synthesis may be important in accelerating the development of a high-level system. Since a delay of a connection lead limits a speed of a digital circuit, the number of connection leads between logic gates may be reduced, thereby solving the speed limit. Accordingly, use of a multi-valued logic (MVL) circuit may be required. The MVL circuit may represent a circuit in which a logic gate is capable of processing logic values more than two logic values of 0 and 1. The MVL circuit may process multiple values in a single logic gate, and accordingly may require fewer logic gates and interconnects in the same function in comparison to a binary logic circuit, and thus improvement in characteristics such as power, performance, and area may be expected.

However, in the MVL, it may be required to develop a new logic synthesis method using a new device (or transistor). Hereinafter, a logic synthesis methodology is described along with a new low power circuit structure for a ternary logic. In order to reduce the number of gates and interconnect complexity, the ternary logic circuit may be designed at the same gate level as that of the binary logic circuit. The ternary logic circuit according to an example embodiment may be based on a static gate design, and may use a single-walled carbon nanotube field effect transistor (CNTFET). First, the CNTFET is described.

Ternary Logic Element

FIG. 1 is a structural diagram of a CNTFET.

The CNTFET 100 may be a field effect transistor in which a single-walled carbon nanotube (SWCNT) is inserted into a transistor. Hereinafter, the single-walled carbon nanotube field effect transistor is referred to as the CNTFET.

An MOSFET-like CNTFET may include a drain, a gate, a source, and a body terminal. A carbon nanotube may operate as a semiconductor or a conductor according to a chirality vector. The chirality vector may represent an array angle of carbon atoms. The chirality vector may be represented as (n, m), and n and m each represent an integer. The chirality vector may be a major factor for determining a threshold voltage of the CNTFET. The threshold voltage of the CNTFET may be inversely proportional to a diameter of the carbon nanotube. A relationship between the threshold voltage, the diameter of the carbon nanotube, and an element value n of the chirality vector may be represented by Equation 1 below.

$$\frac{V_{t1}}{V_{t2}} = \frac{D_{CNT2}}{D_{CNT1}} = -\frac{n_2}{n_1} \quad \text{[Equation 1]}$$

In Equation 1, $V_{t1}$ and $V_{t2}$ each may represent the threshold voltage of the CNTFET, $D_{CNT1}$ and $D_{CNT2}$ each may represent the diameter of the CNTFET, and $n_1$ and $n_2$ each may represent the element value of the chirality vector.

Table 1 below illustrates a diameter and a threshold voltage of a carbon nanotube based on each chirality vector. Three types of CNTFETs having different threshold voltages may be used for n-type and p-type transistors.

TABLE 1

| (n, m) | $D_{CNT}$ (nm) | $V_{tn}$ (V) | $V_{tp}$ (V) |
|---|---|---|---|
| (17, 0) | 1.331 | 0.323 | −0.323 |
| (13, 0) | 1.017 | 0.428 | −0.428 |
| (8, 0) | 0.626 | 0.687 | −0.687 |

In an example embodiment, the ternary logic circuit may use a turn-on/turn-off (ON/OFF) state operation of the CNTFET. A turn-on/turn-off switching operation may be based on a principle that a source-drain current of the CNTFET is determined by a gate voltage. In the same manner as an operation of a CMOS, in a general operation, when a drain voltage $V_{DD}$ is inputted to a gate of a p-type CNTFET, no current may flow between a source and a drain, and the p-type CNTFET may be in a turn-off state. When a ground voltage GND is inputted to the gate of the p-type CNTFET, a current may flow, and the p-type CNTFET may be in a turn-on state. Conversely, when the drain voltage $V_{DD}$ is inputted to a gate of an n-type CNTFET, a current may flow between the source and the drain, and the n-type CNTFET may be in a turn-on operation. When the ground voltage GND is inputted to the gate of the n-type CNTFET, no current may flow, and the n-type CNTFET may be in a turn-off operation.

Furthermore, when a half-drain voltage $V_{DD}/2$ of 0.45 V is inputted to a gate of the CNTFET, the p-type CNTFET and the n-type CNTFET having a chirality vector of (17, 0) may be in a turn-on state, and the p-type CNTFET and the n-type CNTFET having a chirality vector of (8, 0) may be in a turn-off state.

Ternary Logic Circuit

The ternary logic circuit may be a logic circuit based on three logic values. A ternary digit may be called trit, and 1-trit may correspond to $\log_2 3 \approx 1.58$–bit. There are two types of a ternary logic: an unbalanced ternary logic using "0, 1, 2" and a balanced ternary logic using "−1, 0, 1". Hereinafter, logical values of "−1", "0", and "1" of the unbalanced ternary logic are described as "−", "0", and "+", respectively. The ternary logic gate may represent a circuit that performs a logic operation of a ternary function. The ternary logic gate may represent three logic values by using three voltage levels as illustrated in Table 2 below.

TABLE 2

| | Ternary Logic Value | |
|---|---|---|
| Voltage Level | Unbalanced | Balanced |
| Gnd = 0 V | 0 | −1 |
| $V_{DD}/2$ = 0.45 V | 1 | 0 |
| $V_{DD}$ = 0.9 V | 2 | 1 |

A negation ternary function may correspond to a standard ternary inverter (STI) gate of the ternary logic gate, an AND ternary function may correspond to a MIN gate of the ternary logic gate, and an OR ternary function may correspond to a MAX gate of the ternary logic gate. A logic gate having one input variable such as the STI gate may be referred to as a unary operator, and Table 3 below illustrates an exemplary truth table of a balanced ternary system.

TABLE 3

| Input | PTI | STI | NTI | STB | INC | DEC |
|---|---|---|---|---|---|---|
| − | + | + | + | − | 0 | + |
| 0 | + | 0 | − | 0 | + | − |
| + | − | − | − | + | − | 0 |

Static Gate Design

A static gate may include a pull-up network and a pull-down network. Hereinafter, a network may represent a structure in which elements are physically connected, and may be used to have the same meaning as that of a circuit. For example, the pull-up network and the pull-down network may represent a pull-up circuit and a pull-down circuit, respectively. The pull-up network and the pull-down network may include a combination of transistors, and connectivity of a network may be determined by a switching operation of each transistor based on an input voltage. The pull-up network may be connected to a drain power supply that supplies a drain voltage, and may include a p-type transistor. Conversely, the pull-down network may be connected to a ground that supplies a ground voltage, and may include an n-type transistor.

Figure 2A:
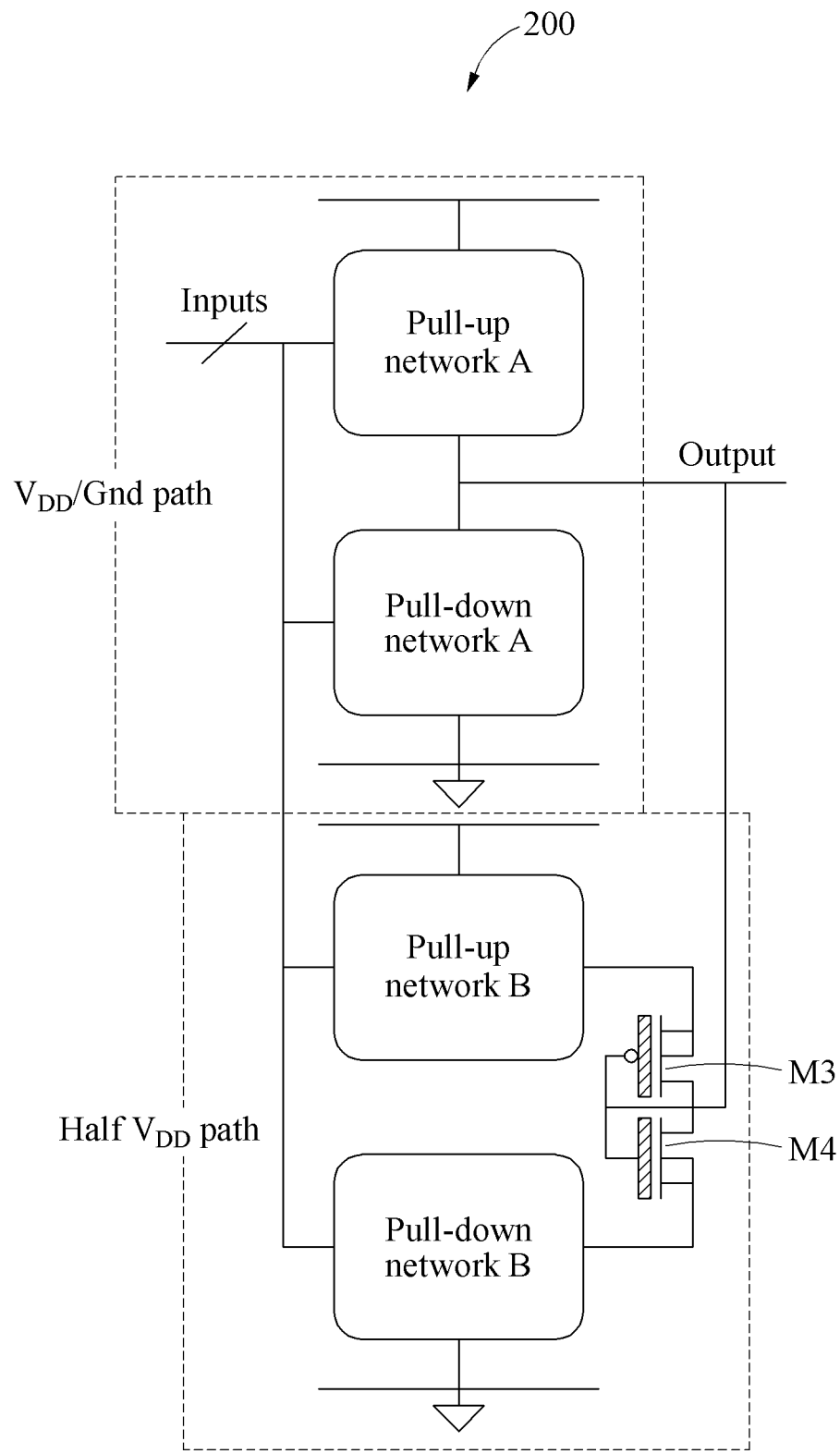
FIG. 2A illustrates a diode-connected transistor-based static gate for a conventional ternary logic gate.

FIG. 2A illustrates a diode-connected transistor-based static gate for a conventional ternary logic gate.

Referring to FIG. 2A, in a conventional diode-connected transistor-based static gate 200, a diode-connected transistor M3 and a diode-connected transistor M4 may be used to output a half-drain voltage $V_{DD}/2$. Specifically, the conventional static gate 200 may output a half-drain voltage as a voltage of an output terminal by using the diode-connected transistor M3 and the diode-connected transistor M4. The diode-connected transistor may have a small area and high energy efficiency in comparison to a resistor, however, may still consume high static power in voltage distribution. Accordingly, in the conventional diode-connected transistor-based static gate 200, there is a short-coming in that power is continuously consumed when the output terminal maintains the half-drain voltage $V_{DD}/2$. Conversely, in a static gate according to an example embodiment, a half-drain may be transferred to the output terminal without voltage distribution in a half-drain path.

Figure 2B:
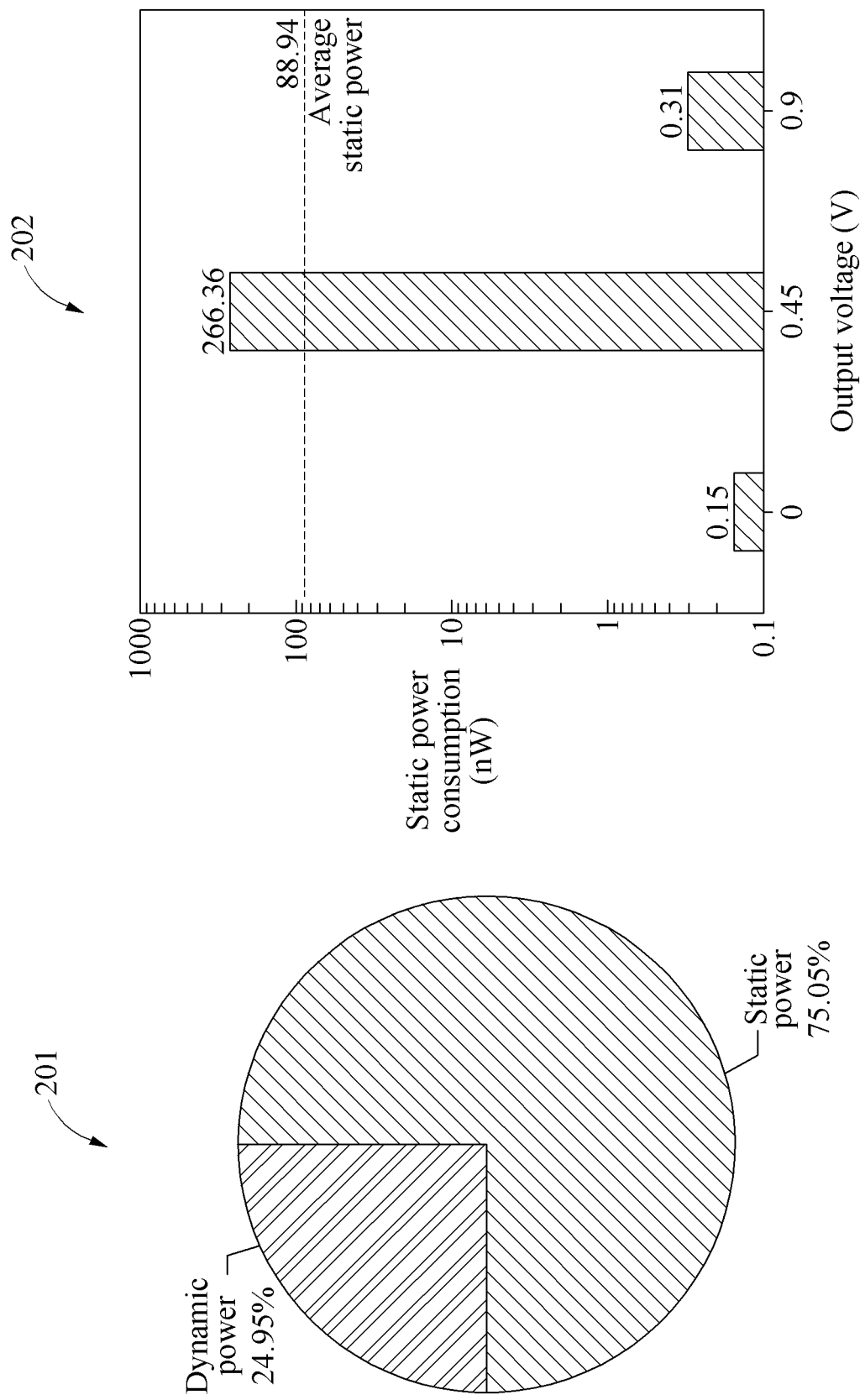
FIG. 2B illustrates a power consumption of a conventional diode-connected transistor-based standard ternary inverter (STI) gate.

FIG. 2B illustrates a power consumption of a conventional diode-connected transistor-based STI gate.

A graph 201 may represent a power consumption ratio of the conventional diode-connected transistor-based STI gate. Referring to the graph 201, the conventional STI gate may consume a power consumption of about 75% as static power. A graph 202 may represent a static power consumption ratio based on an output voltage level of the conventional diode-connected transistor-based STI gate. Referring to the graph 202, an amount of power consumption used to maintain a half-drain voltage as an output voltage may have a difference of 1000 times or more in comparison to an amount of power consumption used to maintain a ground voltage as an output voltage. The difference may be caused by the fact that, in the conventional diode-connected transistor-based STI gate, a voltage divider continuously consumes power after transferring a half-drain voltage.

Figure 3:
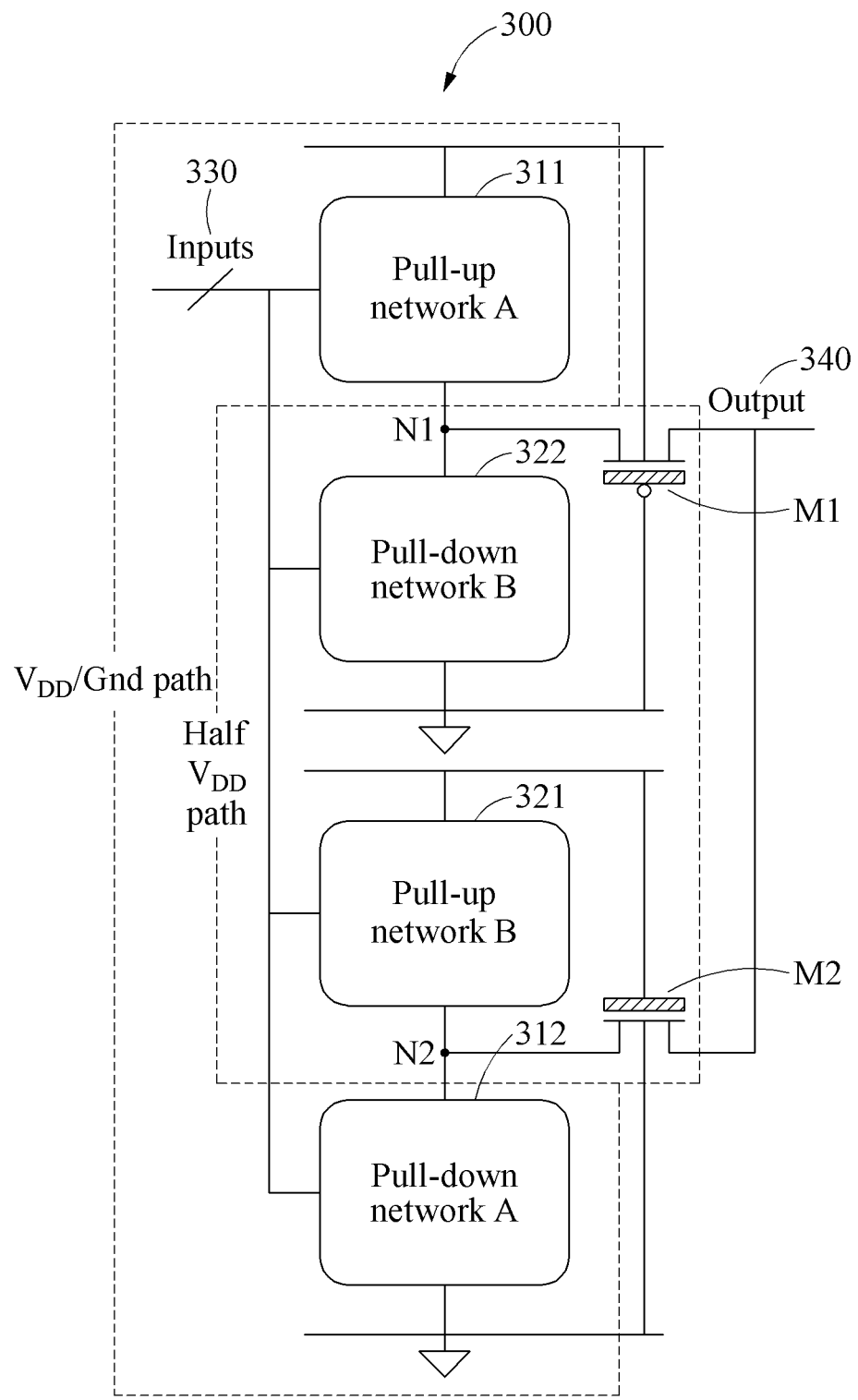
FIG. 3 illustrates a static gate for a proposed ternary logic gate according to an example embodiment.

FIG. 3 illustrates a static gate 300 for a ternary logic gate proposed according to an example embodiment.

The static gate 300 for a ternary logic gate according to an example embodiment may include a first pull-up circuit 311, a first pull-down circuit 312, a second pull-up circuit 321, a second pull-down circuit 322, a first A transistor M1, and a second transistor M2. Hereinafter, the first transistor M1 is described as the first pass transistor M1, and the second transistor M2 is described as the second pass transistor M2. The static gate 300 for a ternary logic gate according to an example embodiment may include a single-walled CNT-FET.

The static gate 300 according to an example embodiment may output a drain voltage through the first pass transistor M1 when the first pull-up circuit 311 is turned on, and may have a drain-ground $V_{DD}/GND$ path for outputting a ground voltage through the second pass transistor M2 when the first pull-down circuit 312 is turned on. In addition, when both the second pull-up circuit 321 and the second pull-down circuit 322 are turned on, the static gate 300 according to an example embodiment may include a half-drain path for outputting a half-drain $V_{DD}/2$ voltage through the first pass transistor M1 and the second pass transistor M2. The first pass transistor M1 may connect a node N1 between the first pull-up circuit 311 and the second pull-down circuit 322 to an output terminal 340, and the second pass transistor M2 may connect a node N2 between the pull-up circuit 321 and the first pull-down circuit 312 to the output terminal 340.

Specifically, in the static gate 300 according to an example embodiment, the first pull-up circuit 311 may connect the second pull-down circuit 322, a drain power supply that supplies a drain voltage, and the first pass transistor M1. The first pull-down circuit 312 may connect the second pull-up circuit 321, a ground that supplies a ground voltage, and the second pass transistor M2. The second pull-up circuit 321 may connect the first pull-down circuit 312, the drain power supply that supplies a drain voltage, and the second pass transistor M2. The second pull-down circuit 322 may connect the first pull-up circuit 311, the ground that supplies the ground voltage, and the first pass transistor M1.

In summary, when the first pull-up circuit 311 is turned on, the drain voltage VDD may be transferred from the drain power supply $V_{DD}$ to the output terminal 340, and when the first pull-down circuit 312 is turned on, the ground voltage GND may be transferred to the output terminal 340. In addition, according to an example embodiment, the second pull-up circuit 321, the second pull-down circuit 322, the first pass transistor M1, and the second pass transistor M2 may be used to transfer a half-drain voltage $V_{DD}/2$ to the output terminal 340.

In the static gate 300 according to an example embodiment, the first pull-up circuit 311 and the second pull-up circuit 321 may include a transistor having a same doping type as that of the first pass transistor M1, and the first pull-down circuit 312 and the second pull-down circuit 322 may include a transistor having a same doping type as that of the second pass transistor M2. In addition, the first pass transistor M1 and the second pass transistor M2 may have opposite doping types. For example, the first pull-up circuit 311, the second pull-up circuit 321, and the first pass transistor M1 each may be a p-type transistor, and the first pull-down circuit 312, the first pull-down circuit 322, and the second pass transistor M2 each may be an n-type transistor.

In the static gate 300 according to an example embodiment, a plurality of circuits 311, 312, 321, and 322 may include two types of transistors having different threshold voltages. The static gate 300 according to an example embodiment may include a transistor having a first threshold voltage less than the half-drain $V_{DD}/2$ voltage and a transistor having a second threshold voltage greater than or equal to the half-drain voltage. When the half-drain voltage $V_{DD}/2$ is applied to an input terminal 330, the two types of transistors having different threshold voltages may be used for different switching operations. When the half-drain voltage is applied to the input terminal 330, the transistor having the first threshold voltage may be turned on, and the transistor having the second threshold voltage may be turned off. In addition, the first pass transistor M1 and the second pass transistor M2 of the static gate 300 according to an example embodiment may be transistors having a third threshold voltage between the first threshold voltage and the second threshold voltage. For example, the first threshold voltage may be 0.323 V, the second threshold voltage may be 0.687 V, and the third threshold voltage may be 0.428 V, but the example embodiments are not limited thereto.

The static gate 300 according to an example embodiment may output the half-drain voltage $V_{DD}/2$. When both the second pull-up circuit 321 and the second pull-down circuit 322 of the static gate 300 according to an example embodiment are turned on to output a half-drain from the output terminal 340, both the first pass transistor M1 and the second pass transistor M2 may be turned off to maintain an output of the half-drain voltage.

Specifically, in the static gate 300 according to an example embodiment, when a voltage of the output terminal 340 decreases from the drain voltage to the half-drain voltage, the second pull-down circuit 322 may be turned on, so that a voltage of the first node N1 may be transitioned from the drain voltage to the ground voltage, and the first pass transistor M1 connected to the first node N1 may maintain the output voltage to be at the half-drain. In this case, when the voltage of the first node N1 becomes less than or equal to a threshold voltage, the first pass transistor M1 may be turned off.

In addition, in the static gate 300 according to an example embodiment, when the voltage of the output terminal 340 increases from the ground voltage to the half-drain voltage, the second pull-up circuit 321 may be turned on, so that a voltage of the second node N2 may be transitioned from the ground voltage to the drain voltage, and the second pass transistor M2 connected to the second node N2 may maintain the output voltage to be at the half-drain voltage. In this case, when the voltage of the second node N2 becomes greater than or equal to a voltage obtained by subtracting the threshold voltage from the drain voltage, the second pass transistor M2 may be turned off.

In addition, in the static gate 300 according to an example embodiment, a body of the first pass transistor M1 may be connected to the drain power supply that supplies the drain voltage, and a body of the second pass transistor M2 may be connected to the ground that supplies the ground voltage GND. Although described below, in the static gate according to an example embodiment, a static power consumption for maintaining the output voltage to be at the half-drain may be greatly decreased by using a body effect.

In the static gate 300 according to an example embodiment, on-current-based output voltage transition may be possible due to a drop in threshold voltages of pass transistors, and off-current-based output voltage maintenance may be possible due to the body effect. By using a pass transistor, an energy-efficient ternary logic circuit design may be possible, which is described in detail below.

Hereinafter, a circuit operation of an STI gate among static ternary logic gates according to an example embodiment is described.

Figure 4:
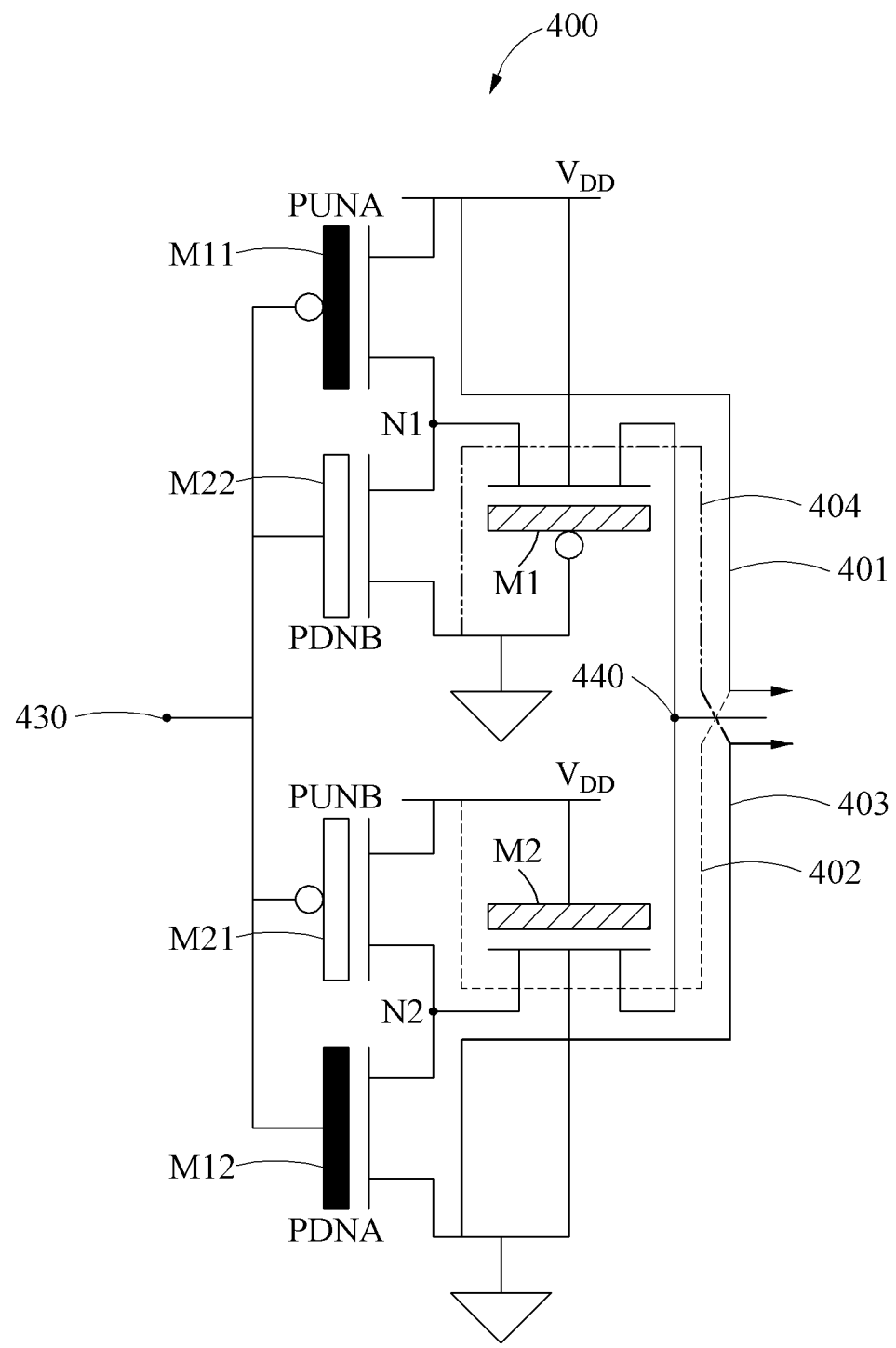
FIG. 4 illustrates a circuit operation of a pass transistor-based STI gate according to an example embodiment.

FIG. 4 illustrates a circuit operation of a pass transistor-based STI gate according to an example embodiment.

FIG. 4 illustrates a path through which a drain voltage $V_{DD}$ is outputted from an output terminal 440 and a path through which a ground voltage GND is outputted from the output terminal 440. A first pull-up circuit may include a p-type transistor M11 having a second threshold voltage, and a first pull-down circuit may include an n-type transistor M12 having the second threshold voltage. In addition, a second pull-up circuit may include a p-type transistor M21 having a first threshold voltage, and a second pull-down circuit may include an n-type transistor M22 having the first threshold voltage. In the pass transistor-based STI gate 400 according to an example embodiment, the first transistor M1 may be a p-type transistor having a third threshold voltage, and the second transistor M2 may be an n-type transistor having the third threshold voltage.

First, the path through which the drain voltage $V_{DD}$ is outputted from the output terminal 440 is described. In order to output a drain voltage to the output terminal 440, the ground voltage GND may be applied to an input terminal 430. When the ground voltage GND is applied to the input terminal 430, the transistor M11 may be turned on to supply a drain voltage supplied by a drain power supply to a source of the p-type first pass transistor M1. When the ground voltage GND is applied to the input terminal 430, the transistor M12 and the transistor M22, which are pull-down circuits, may be turned off. The p-type first pass transistor M1 may be turned on since a gate-source voltage is greater than a threshold voltage. Accordingly, a voltage of the output terminal 440 may reach the drain voltage $V_{DD}$ by means of the first pass transistor M1. A path 401 may be a main path for outputting the drain voltage to the output terminal 440.

When the drain voltage is outputted from the output terminal 440, a path 402 may be an auxiliary path for supplying the drain voltage to the output terminal 440. Since the drain voltage is transferred to the output terminal 440 from the main path 401, the n-type second pass transistor M2 may not need to be turned on so as to necessarily transfer the drain voltage to the output terminal 440. When the drain voltage is outputted from an output terminal of a static gate according to an example embodiment, the second pull-up circuit that determines an operation of the n-type second pass transistor M2 may be turned on or turned off. In this case, an operation of the second pull-up circuit may be referred to as don't care, and a transistor count of a circuit may be reduced by using don't care. In the STI gate 400 according to an example embodiment, when the ground voltage GND is applied to the input terminal 430, both the transistor M21 and the n-type second pass transistor M2 may be turned on. The path 402 may be an auxiliary path for supplying the drain voltage to the output terminal 440.

Next, a path through which the ground voltage GND is outputted from the output terminal 440 is described. In order to output a ground voltage to the output terminal 440, the drain voltage $V_{DD}$ may be applied to the input terminal 430. When the drain voltage $V_{DD}$ is applied to the input terminal 430, the transistor M12 may be turned on to supply a ground voltage supplied by a ground to a source of the n-type second pass transistor M2. When the drain voltage $V_{DD}$ is applied to the input terminal 430, the transistors M11 and M21, which are pull-up circuits, may be turned off. The n-type second pass transistor M2 may be turned on since the gate-source voltage is greater than the threshold voltage. Accordingly, the voltage of the output terminal 440 reaches the ground voltage GND by means of the second pass transistor M2. The path 403 may be a main path for outputting the ground voltage to the output terminal 440.

When the output terminal 440 outputs the ground voltage, a path 404 may be an auxiliary path for supplying the ground voltage to the output terminal 440. Since the ground voltage is transferred to the output terminal 440 from the main path 403, the p-type first pass transistor M1 may not need to be turned on so as to necessarily transfer the ground voltage to the output terminal 440. When the ground voltage is outputted from the output terminal of the static gate according to an example embodiment, the second pull-down circuit that determines an operation of the p-type first pass transistor M1 may be turned on or turned off. In this case, an operation of the second pull-down circuit may be referred to as don't care, and a transistor count of the circuit may be reduced by using don't care. In the STI gate 400 according to an example embodiment, when the drain voltage VDD is applied to the input terminal 430, both the transistor M22 and the p-type first pass transistor M1 may be turned on. The path 404 may be an auxiliary path for supplying the ground voltage to the output terminal 440.

Figure 5A:
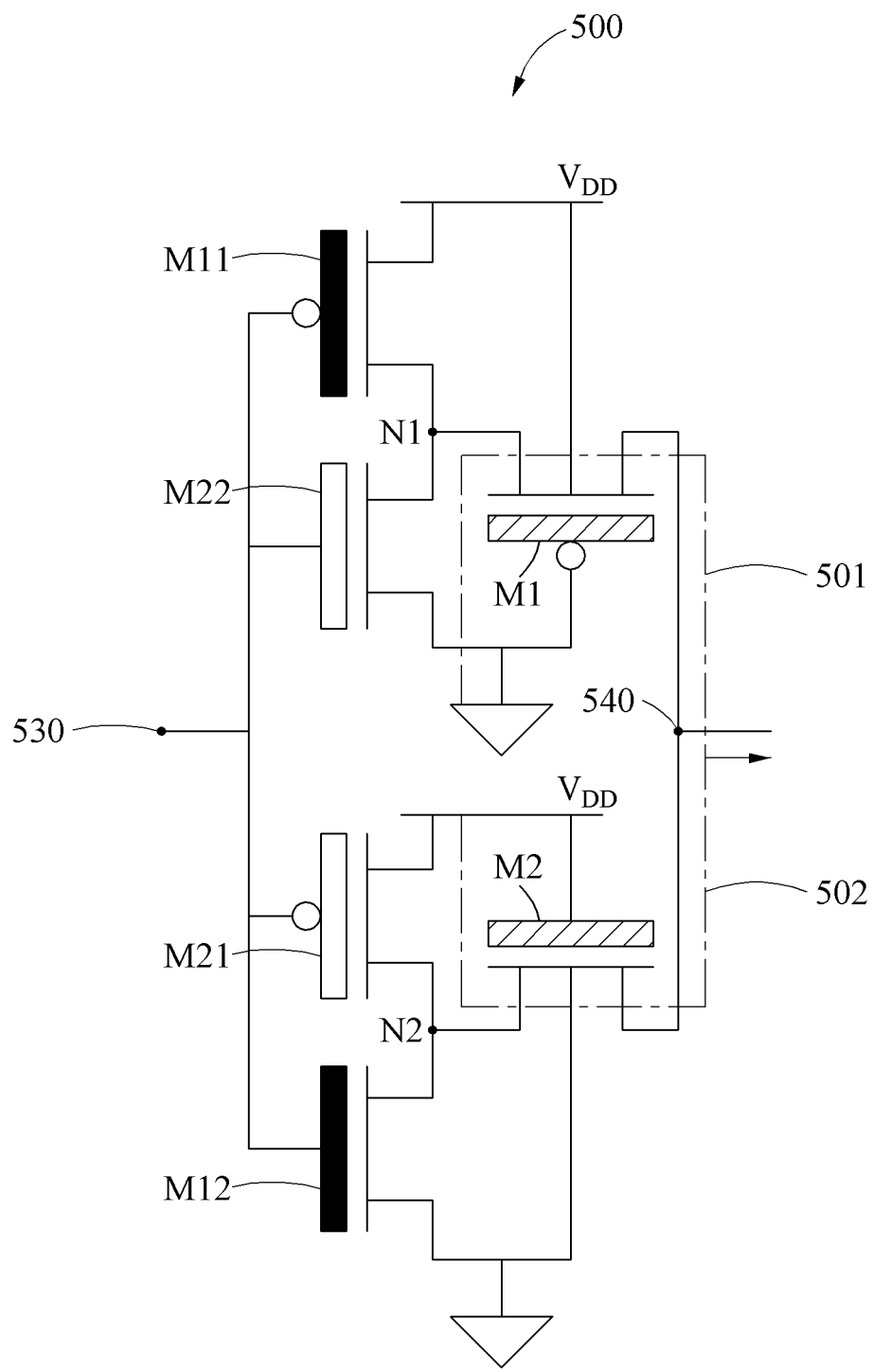
FIG. 5A illustrates a circuit operation of a pass transistor-based STI gate according to an example embodiment.

FIG. 5A illustrates a circuit operation of a pass transistor-based STI gate 500 according to an example embodiment.

Specifically, FIG. 5A illustrates a process of a half-drain voltage being outputted to an output terminal 540 when an output voltage decreases from a drain voltage to the half-drain voltage. In order to decrease an output voltage of the output terminal 540 from the drain voltage to the half-drain voltage, a voltage applied to the input terminal 530 may increase from a ground voltage to the half-drain voltage. When the voltage applied to the input terminal 530 increases from the ground voltage to the half-drain voltage, a transistor M22 may be turned on, so that a source voltage of a p-type first pass transistor M1 may be transitioned from the drain voltage to the ground voltage. In other words, the transistor M22 may be turned on, so that a voltage of the first node N1 may be transitioned from the drain voltage to the ground voltage. The first pass transistor M1 may maintain a turned-on state thereof, and may change the output voltage of the output terminal 540 from a drain voltage $V_{DD}$ to a half-drain voltage $V_{DD}/2$ with a low delay. When the source voltage of the first pass transistor M1 is transitioned to be less than or equal to a threshold voltage, the first pass transistor M1 may be turned off. In this case, the first pass transistor M1 may not reduce the output voltage of the output terminal 540 to be less than or equal to a third threshold voltage (for example, 0.428 V) of a first transistor due to a drop in the threshold voltage. In other words, when a voltage of the node N1 decreases to be less than or equal to the third threshold voltage, the p-type first pass transistor M1 may be turned off, and the output voltage of the output terminal 540 may be reduced to be less than or equal to a half-drain (exactly, the third threshold voltage). In addition, when the output voltage decreases from the drain voltage to the half-drain voltage, the n-type second pass transistor M2 may be turned off. The n-type second pass transistor M2 may not increase the output voltage to be greater than or equal to a voltage ($V_{DD}-V_{tn}$=0.472 V) obtained by subtracting the third threshold voltage from the drain voltage due to a drop in the voltage. Thus, the voltage of the output terminal 540 may have a stable point around the half-drain voltage.

When the output voltage increases from the ground voltage GND to the half-drain voltage $V_{DD}/2$, a circuit may operate on the same principle. In order to increase the output voltage of the output terminal 540 from the ground voltage to the half-drain voltage, the voltage applied to the input terminal 530 may decrease from the drain voltage to the half-drain voltage. When the voltage applied to the input terminal 530 decreases from the drain voltage to the half-drain voltage, the transistor M21 may be turned on, so that a source voltage of the n-type second pass transistor M2 may be transitioned from the ground voltage to the drain voltage. In other words, the transistor M21 may be turned on, so that a voltage of the second node N2 may be transitioned from the ground voltage to the drain voltage. The second pass transistor M2 may maintain a turn-on state thereof, and may change the output voltage of the output terminal 540 from the ground voltage GND to the half-drain voltage $V_{DD}/2$ with a low delay. When the source voltage of the second pass transistor M2 is transitioned to exceed a voltage ($V_{DD}-V_{tn}$=0.472 V) obtained by subtracting the third threshold voltage from the drain voltage, the second pass transistor M2 may be turned off. In this case, the second pass transistor M2 may not increase the output voltage of the output terminal 540 to exceed the voltage ($V_{DD}-V_{tn}$=0.472 V) obtained by subtracting the third threshold voltage from the drain voltage of the second transistor due to a drop in the threshold voltage. In other words, when a voltage of the node N2 increases to exceed the voltage ($V_{DD}-V_{tn}$=0.472 V) obtained by subtracting the third threshold voltage from the drain voltage, the n-type second pass transistor M2 may be turned off, and the output voltage of the output terminal 540 may not be increased to be greater than the half-drain (exactly, the voltage obtained by subtracting the third threshold voltage from the drain voltage). In addition, when the output voltage increases from the ground voltage to the half-drain voltage, the p-type first pass transistor M1 may be turned off. The p-type first pass transistor M1 may not reduce the output voltage to be less than or equal to the third threshold voltage due to a drop in the voltage. Thus, the voltage of the output terminal 540 may have a stable point around the half-drain voltage.

Figure 5B:
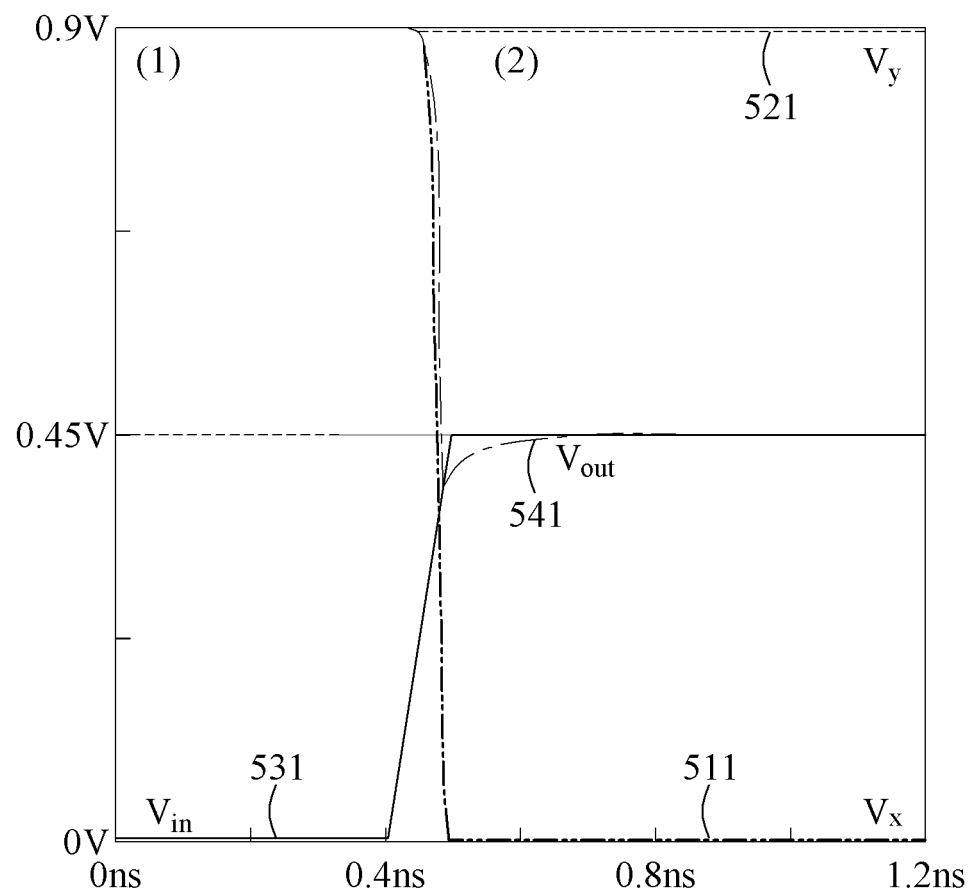
FIG. 5B illustrates a voltage change of each node when an output voltage decreases from a drain voltage to a half-drain voltage in an STI gate according to an example embodiment.

FIG. 5B illustrates a voltage change of each node when an output voltage decreases from a drain voltage to a half-drain voltage in an STI gate according to an example embodiment.

A graph 531 may represent the voltage of the input terminal 530. The voltage applied to the input terminal 530 may increase from the ground voltage to the half-drain voltage. A graph 521 may represent the voltage of the second node N2, and the voltage of the second node N2 may maintained to be at the drain voltage. A graph 511 may represent the voltage of the first node N1. When the voltage applied to the input terminal 530 increases from the ground voltage to the half-drain voltage, the transistor M22 may be turned on, so that the voltage of the first node N1 may be transitioned from the drain voltage to the ground voltage. A graph 541 may represent the voltage of the output terminal 540. The output voltage of the output terminal 540 may decrease from the drain voltage to the half-drain voltage since the first pass transistor M1 is turned on. Referring to a change in the output voltage at a time of 0.5 ns in the graph 541, when the voltage of the node N1 decreases to be less than or equal to the third threshold voltage, the first pass transistor M1 may be turned off, and the output voltage of the terminal 540 may not be decreased to be less than or equal to the half-drain (exactly, the third threshold voltage) due to a drop in the threshold voltage, so that the output voltage may increase to the half-drain voltage. When the output voltage of the output terminal 540 increases to be greater than or equal to the voltage ($V_{DD}-V_{tn}$=0.472 V) obtained by subtracting the third threshold voltage from the drain voltage, the n-type second pass transistor M2 may be turned off, so that the output voltage of the output terminal 540 may decrease due to a drop in the threshold voltage. The voltage of the output terminal 540 may have a stable point around the half-drain voltage.

Figure 6:
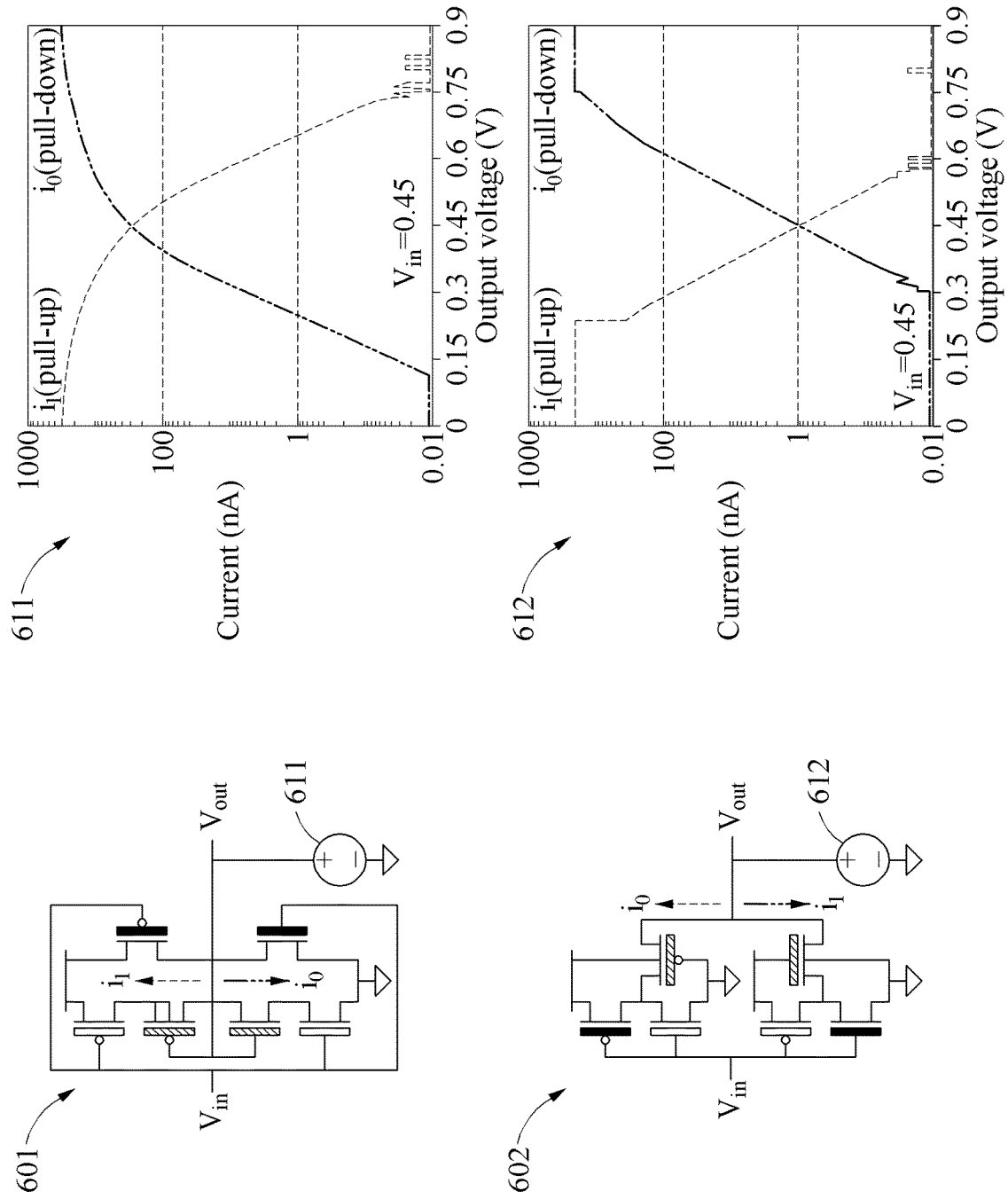
FIG. 6 illustrates a current change based on an output voltage change due to an external power supply in an STI gate.

FIG. 6 illustrates a current change based on an output voltage change due to an external power supply in an STI gate.

FIG. 6 illustrates a process in which an STI gate according to an example embodiment maintains a level of an output voltage as a level of a half-drain voltage while a voltage is changed due to an output voltage noise. A first STI gate 601 may represent a conventional diode-connected transistor-based STI gate. A graph 611 may represent a current change based on an output voltage change due to an external power supply 611 in the first STI gate 601. A second STI gate 602 may represent a pass transistor-based STI gate according to an example embodiment. A graph 612 may represent a current change based on an output voltage change due to an external power supply 612 in the second STI gate 602.

Referring to the graph 612 showing the current change in the STI gate according to an example embodiment, a pull-down current $i_0$ may represent a current flowing through the first pass transistor M1, and a pull-up current ii may represent a current flowing through the second pass transistor M2. Referring to the graph 612, in response to a decrease in the voltage of the output terminal by the external power supply 612, a pull-down current flowing through the first pass transistor may decrease, and a pull-up current flowing through the second pass transistor may increase. In addition, in response to an increase in the voltage of the output terminal caused by the external power supply 612, the pull-down current flowing through the first pass transistor may increase, and the pull-up current flowing through the second pass transistor may decrease. In summary, the pass transistor-based STI gate according to an example embodiment may have a negative feedback with respect to a change in the output voltage caused by the external power supply. Further, when there is no change in the output voltage, the pass transistor-based STI gate 602 according to an example embodiment may have a lower static current in comparison to the conventional diode-connected transistor-based STI gate 601. For example, the pass transistor-based STI gate 602 according to an example embodiment may have a static current of about 1 nA while the conventional diode-connected transistor-based STI gate 601 has a static current of about 300 nA.

Figure 7:
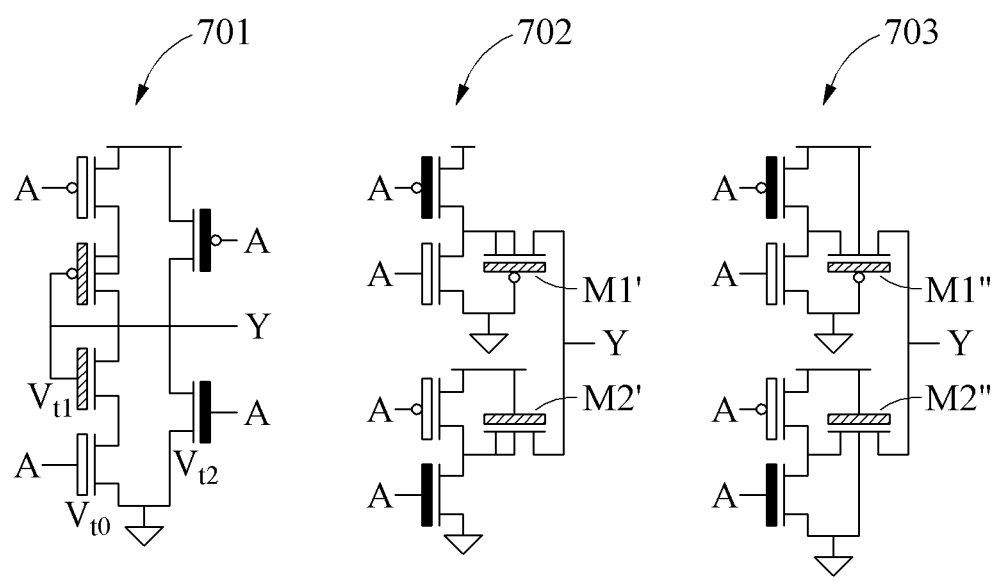
FIG. 7 illustrates an STI gate with a body effect according to an example embodiment.

FIG. 7 illustrates an STI gate with a body effect according to an example embodiment.

The body effect may represent a change in the threshold voltage caused by a voltage difference $V_{sb}$ between a source and a body in a transistor. As the voltage difference between the source and the body increases, a drain-source current $I_{ds}$ may decrease, and accordingly a transfer delay of a logic gate may increase. In particular, in comparison to a CMOS, the CNTFET may have a greatly reduced drain-source current due to the body effect. Thus, in a conventional design of a binary logic gate, the body effect may be eliminated by connecting the body and the source of the transistor. However, in the static gate according to an example embodiment, a static power consumption for maintaining an output voltage to be at a half drain may be greatly reduced by using the body effect.

An STI gate 701 may be a conventional diode-connected transistor-based STI gate. An STI gate 702 may be a pass transistor-based STI gate that does not use the body effect. An STI gate 703 may be a pass transistor-based STI gate using the body effect according to an example embodiment.

In the STI gate 702, a body and a source of a first pass transistor M1' may be connected to each other, and a body and a source of a second pass transistor M2' may be connected to each other. Therefore, no body effect may occur in the STI gate 702.

Conversely, in the gate 703 according to an example embodiment, a body of a first pass transistor M1" may be connected to a drain power supply, and a body of a second pass transistor M2" may be connected to a ground power supply. When the first pass transistor M1" and the second pass transistor M2" are turned on, no body effect may not occur. However, when the first pass transistor M1" and the second pass transistor M2" are turned off, a voltage difference between the source and the body may become a drain voltage, so that a current level may decrease due to the body effect. In the STI gate 703 according to an example embodiment, the body effect may occur only when an output voltage is maintained to be at a half drain. Due to the body effect, a static current may decrease, thereby greatly reducing a static power consumption. The STI gate according to an example embodiment may minimize performance degradation of a ternary logic gate by using a selective body effect, thereby improving the static power consumption. In summary, in the gate 703 according to an example embodiment, a level of the output voltage may be changed to a level of the half-drain by using an on-current of a half-drain path, and a voltage level of the half drain may be maintained by using low static currents of the pass transistors M1" and M2".

Figure 8:
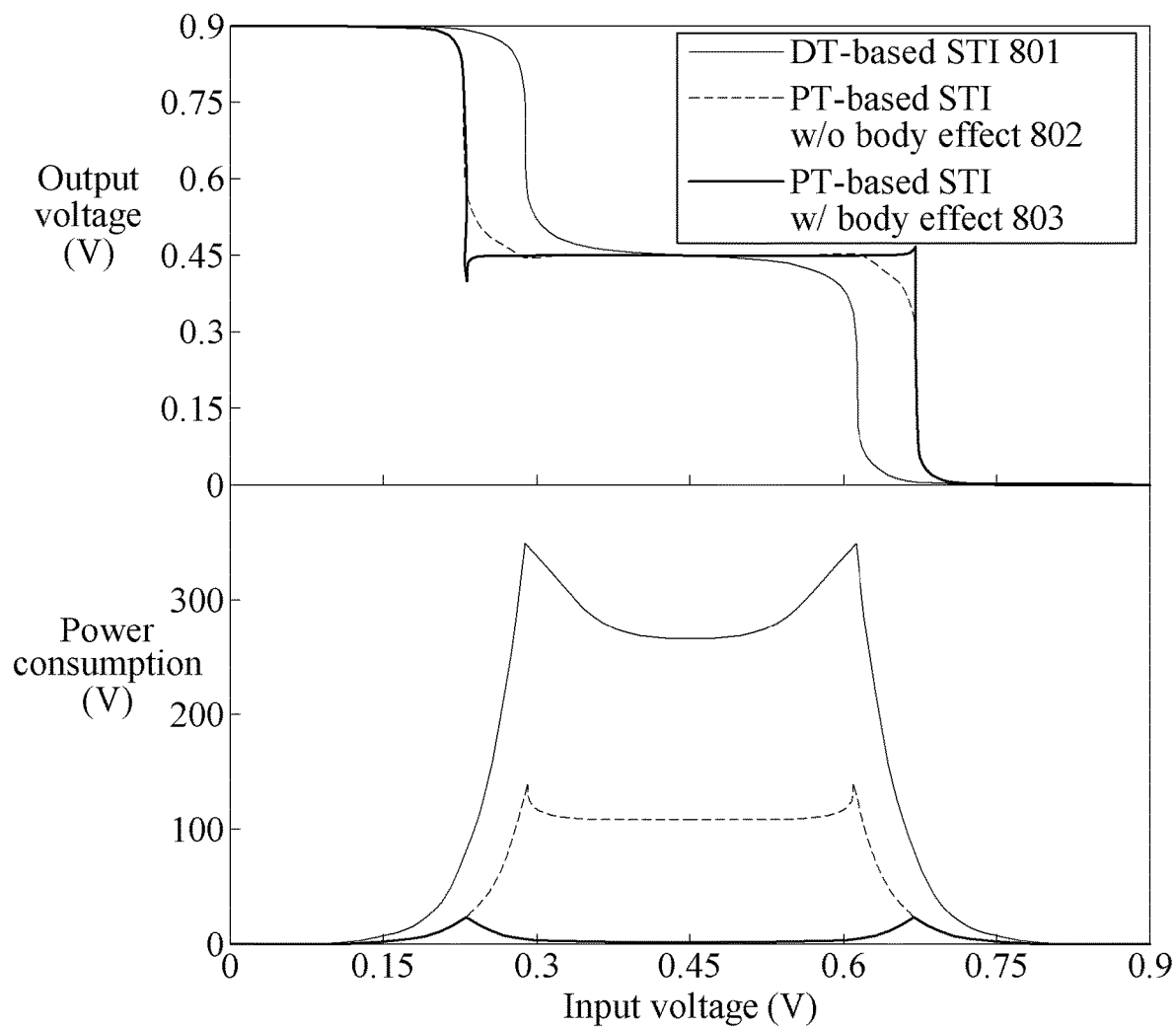
FIG. 8 illustrates a graph of an output voltage and a power consumption based on an input voltage in an STI gate.

FIG. 8 illustrates a graph of an output voltage and a power consumption based on an input voltage in an STI gate.

A graph 801 may represent an output voltage and a power consumption based on an input voltage of a conventional diode-connected transistor-based STI gate. A graph 802 may represent an output voltage and a power consumption based on an input voltage of a pass transistor-based STI gate that does not use a body effect. A graph 803 may represent an output voltage and a power consumption based on an input voltage of a pass transistor-based STI gate using a body effect according to an example embodiment.

In a voltage transfer characteristic, a range of an input voltage where an output voltage is a half-drain voltage (for example, 0.45 V) may increase in the pass transistor-based STI gate rather than the diode-connected transistor-based STI gate. In addition, when the output voltage is the half-drain voltage, the pass transistor-based STI gate with the body effect may be greatly reduced in terms of a power consumption in comparison to the diode-connected transistor-based STI gate. When a voltage applied to an input terminal is a half-drain (for example, 0.45 V), referring to the graph 801, the static power consumption of the diode-connected transistor-based STI gate may be 265.38 nW. Referring to the graph 802, the static power consumption of the pass transistor-based STI gate without the body effect may be 107.75 nW. Referring to the graph 803, the static power consumption of the pass transistor-based STI gate with the body effect may be 0.98 nW. This result shows importance of the body effect in a proposed structure.

Figure 9:
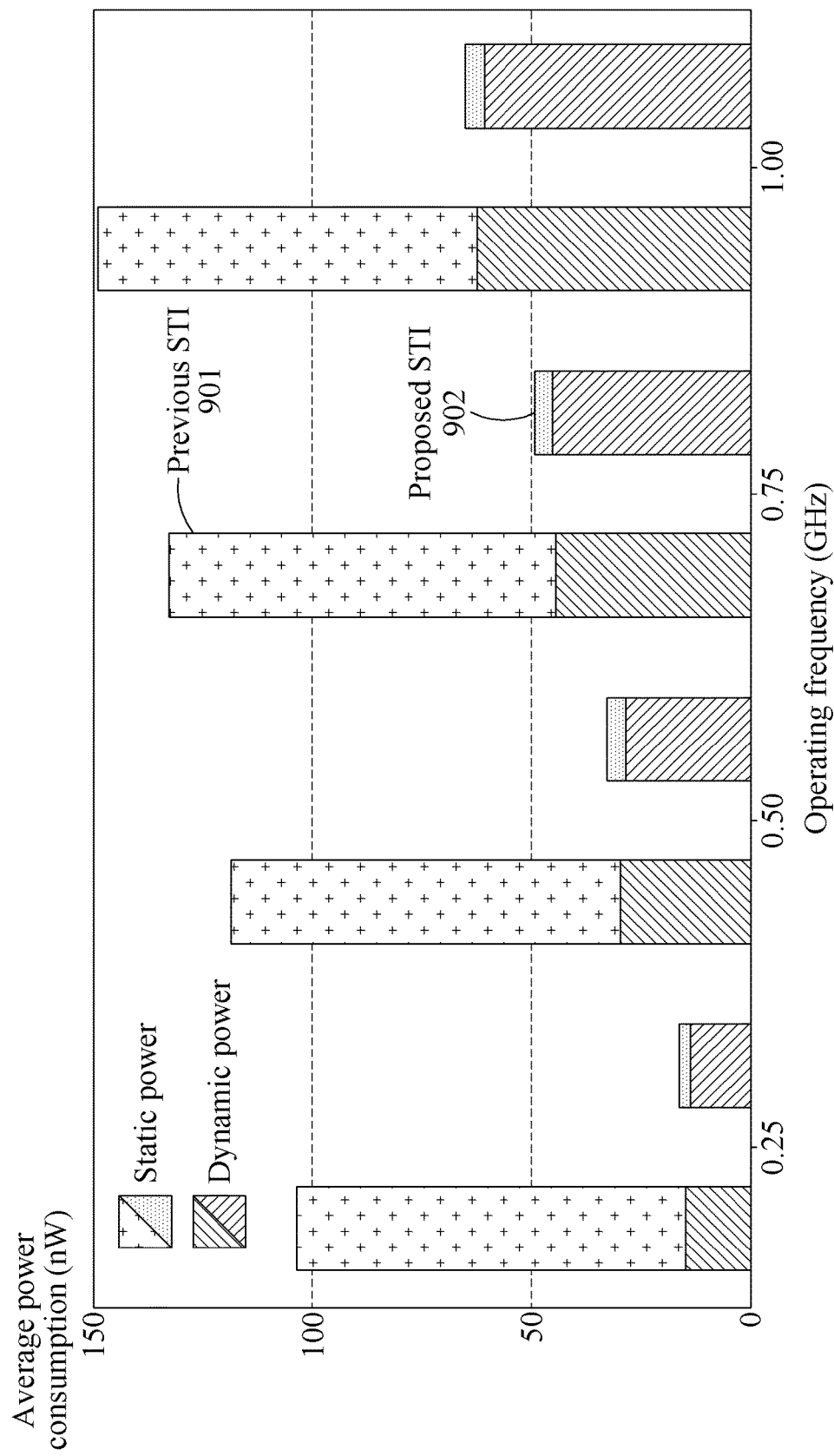
FIG. 9 illustrates an average power consumption based on an operating frequency in an STI gate.

FIG. 9 illustrates an average power consumption based on an operating frequency in an STI gate.

A graph 901 may represent an average power consumption based on an operating frequency in a conventional diode-connected transistor based STI gate. A graph 902 may represent an average power consumption based on an operating frequency in a pass transistor-based STI gate according to an example embodiment. In comparison to a power consumption of the diode-connected transistor-based STI gate, the pass transistor-based STI gate may have a dynamic power consumption reduced by 3.16% on average, a static power consumption reduced by 95.30%, and a total power consumption reduced by 68.89%. The static power consumption may account for 71.47% of the total power consumption in the diode-connected transistor-based STI gate, and may be reduced to 11.79% of the total power consumption in the pass transistor-based STI.

Figure 10:
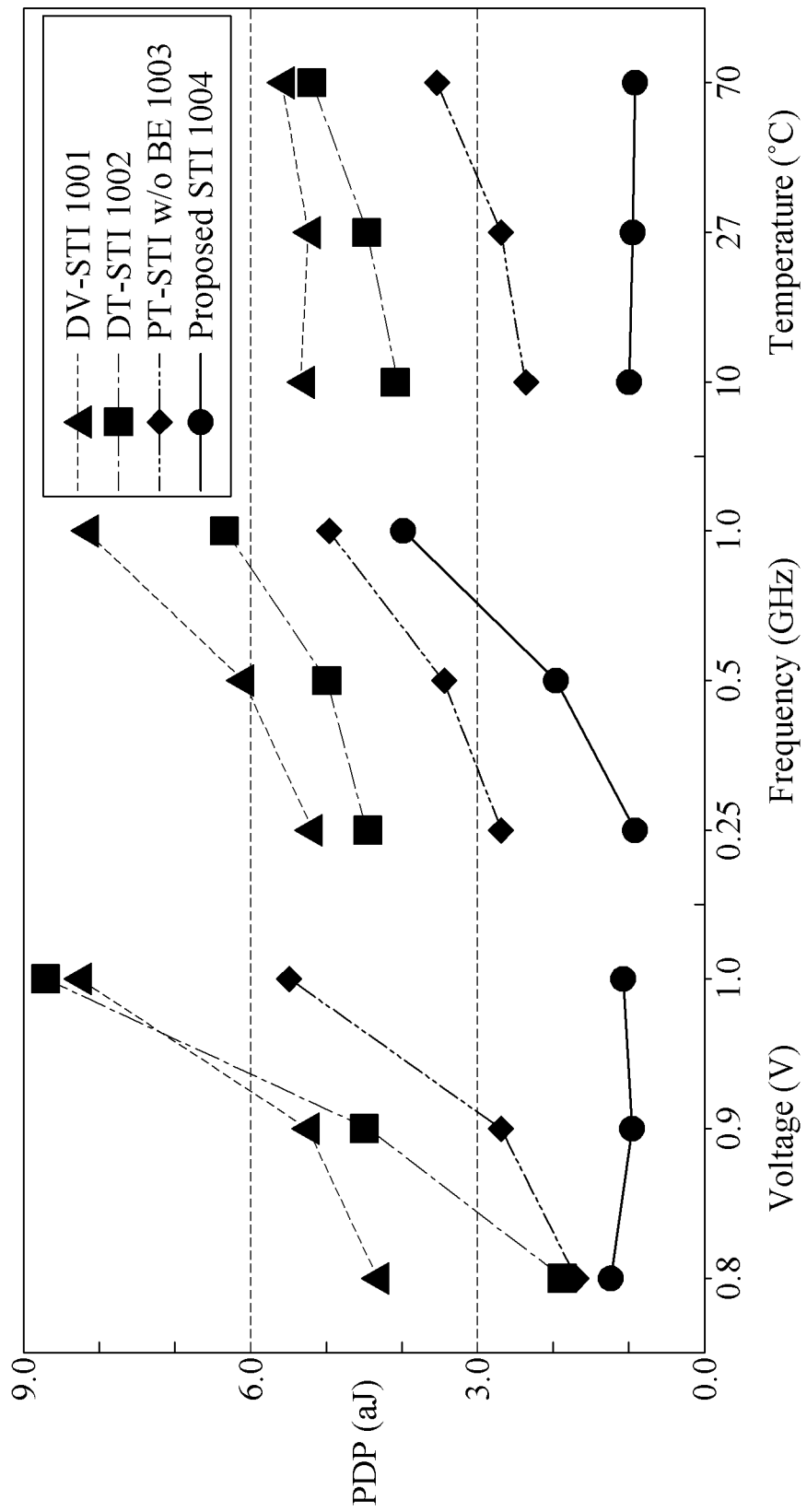
FIG. 10 illustrates energy efficiency in different operating conditions for each STI gate.

FIG. 10 illustrates energy efficiency in different operating conditions for each STI gate.

Energy efficiency may be represented in power-delay product (PDP), and may represent a value obtained by multiplying an average power consumption by a worst delay. A graph 1001 may represent energy efficiency changes in different operating conditions of an STI gate DV-STI based on a dual power supply. A graph 1002 may represent energy efficiency changes in different operating conditions of a diode-connected transistor-based STI gate. A graph 1003 may represent energy efficiency changes of a pass transistor-based STI gate without a body effect. A graph 1004 may represent energy efficiency changes of a pass transistor-based STI gate with a body effect. The pass transistor-based STI gate with a body effect may be more energy efficient at a higher voltage, a higher temperature, and a lower frequency in comparison to other STI gates.

Figure 11:
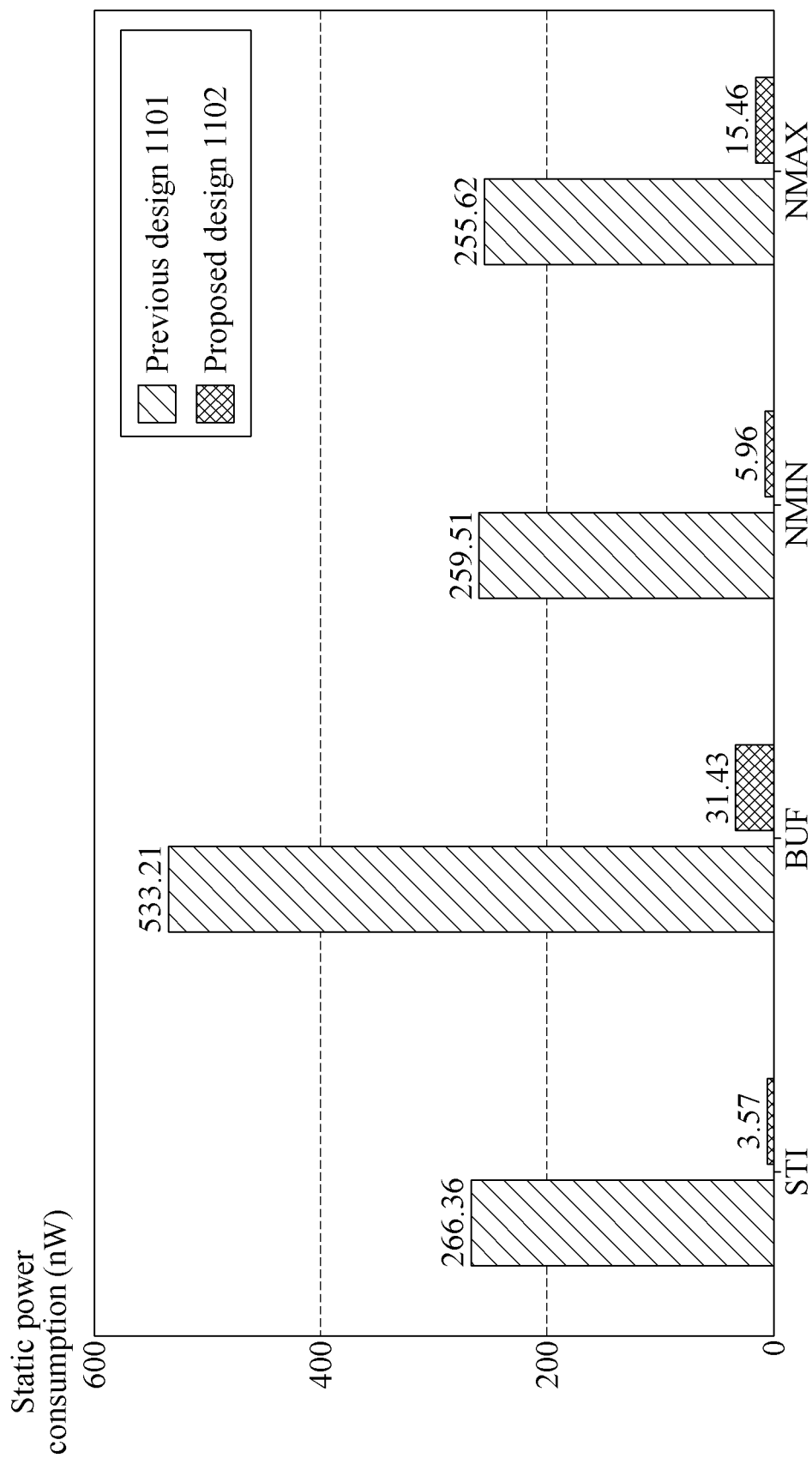
FIG. 11 illustrates a static power consumption between a conventional static gate and a static gate according to an example embodiment.

FIG. 11 illustrates a static power consumption between a conventional static gate and a static gate according to an example embodiment.

FIG. 11 illustrates an improvement in a static power consumption of a proposed pass transistor structure-based static gate compared to a conventional diode-connected transistor structure-based static gate with respect to various logic ternary gates. A graph 1101 may represent a static power consumption of a conventional diode-connected transistor-based static gate. A graph 1102 may represent a static power consumption of a pass transistor-based static gate according to an example embodiment. When an output voltage is a half-drain voltage (for example, 0.45 V), the static power consumption of the pass transistor-based static gate may be reduced by 98.66% in comparison to the diode-connected transistor-based static gate. In addition, static power consumptions of BUF, NMIN, and NMAX may be reduced by 94.11%, 97.70%, and 93.95%, respectively, in the pass transistor-based static gate.

Table 4 below illustrates a comparison of various STIs and NMINs in terms of an average power consumption, a work delay, and a PDP at 0.25 GHz.

TABLE 4

| Condition | Transistor Count | Average Power Consumption(nW) | Worst Delay(ns) | Power-Delay Product(aJ) |
| --- | --- | --- | --- | --- |
| DV-STI | 5 | 69.51 | 0.076 | 5.248 |
| DV-STI | 6 | 103.6 | 0.043 | 4.465 |
| PT-STI w/o BE | 6 | 50.86 | 0.053 | 2.680 |
| Proposed STI | 6 | 16.41 | 0.058 | 0.950 |
| DV-NMIN | 10 | 44.62 | 0.140 | 6.247 |
| DT-NMIN | 10 | 102.6 | 0.053 | 5.479 |
| PT-NMIN w/o BE | 10 | 51.68 | 0.076 | 3.907 |
| Proposed NMIN | 10 | 17.29 | 0.087 | 1.504 |

In comparison to a dual power-based STI gate (DV-STI), a diode-connected transistor-based STI gate (DT-STI), and a pass transistor-based STI gate without a body effect (PT-STI w/o BE), a PDP of a pass transistor-based STI gate according to an example embodiment may be reduced by 81.90%, 78.72%, and 64.55%, respectively. In comparison to a dual power-based NMIN gate (DV-NMIN), a diode-connected transistor-based NMIN gate (DT-NMIN), and a pass transistor-based STI gate without a body effect (PT-NMIN w/o BE), a PDP of a pass transistor-based NMIN gate according to an example embodiment may be reduced by 75.92%, 72.54%, and 61.50%, respectively.

Ternary Logic Synthesis Methodology

Figure 12:
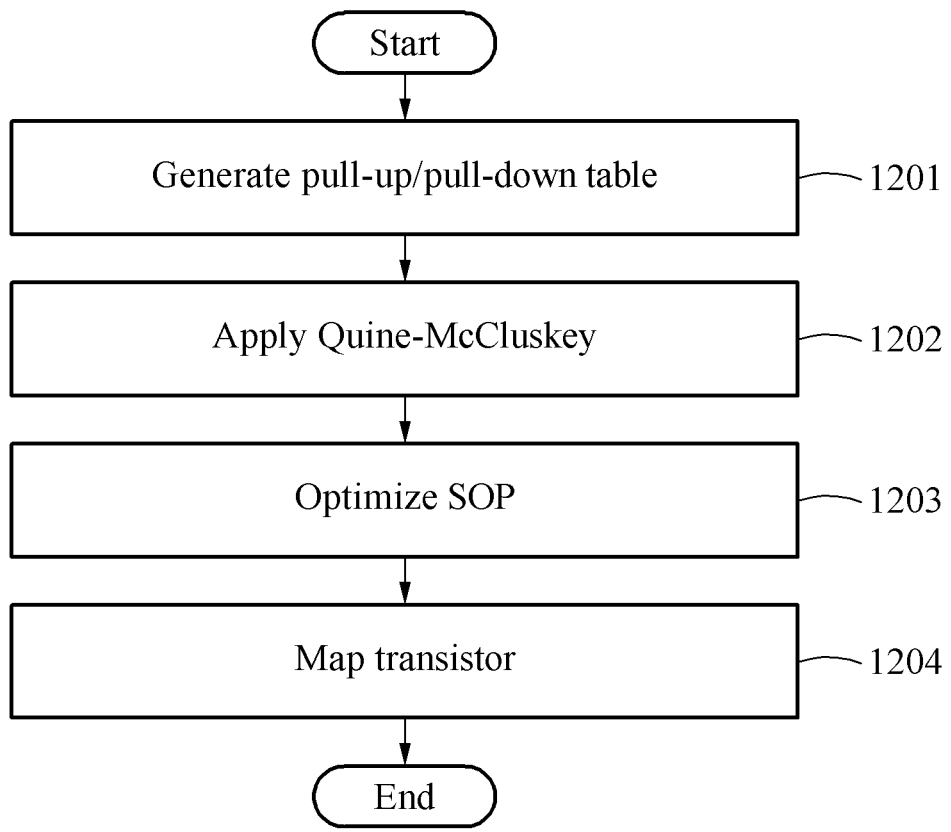
FIG. 12 is a flowchart illustrating a process of synthesizing a ternary logic according to an example embodiment.

FIG. 12 is a flowchart illustrating a process of synthesizing a ternary logic according to an example embodiment. A method for synthesizing a ternary logic according to an example embodiment may include a pull-up/pull-down table generating operation 1201, a modified Queen McCluskey algorithm applying operation 1202, a sum of products (SOP) optimizing operation 1203, and a transistor mapping operation 1204.

In the process of synthesizing a ternary logic according to an example embodiment, first, a pull-up table and a pull-down table of a drain-ground path, and a pull-up table and a pull-down table of a half-drain $V_{DD}/2$ path may be generated by using a truth table representing a ternary function (1201). Each pull-up/pull-down table may represent a switching operation of a corresponding network. Don't care terms may appear in the pull-up/pull-down table of the half-drain path, and may need to be processed differently from the pull-up/pull-down table of the drain-ground path. By inserting turn-on or turn-off into all the don't care terms, pull-up/pull-down tables of all possible half-drain paths may be generated.

Next, a modified Quine-McCluskey algorithm may be applied to all the pull-up/pull-down tables of the drain-ground path and the half-drain path (1202). The modified Queen-McCluskey algorithm may convert all parts of the pull-up/pull-down tables having a turn-on state into minterm canonical expressions. The converted minterms may decrease through a repetitive merging process, and may generate one or more SOPs.

Next, an SOP which optimizes a ternary logic circuit may be selected through the SOP optimizing operation 1203. Last, a suitable transistor may be mapped 1204 by using the selected SOP. Each operation is described in detail below.

Figure 13:
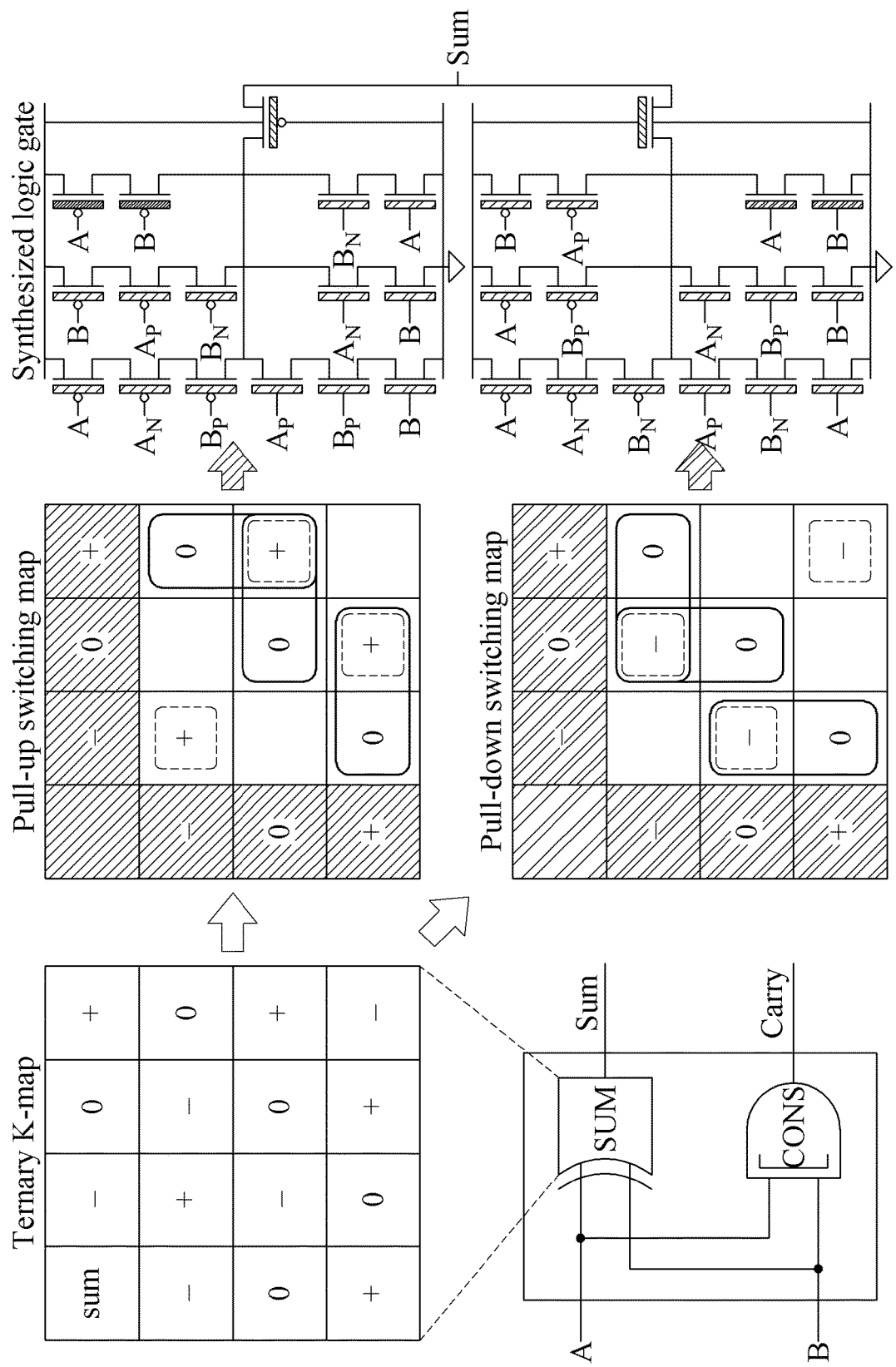
FIG. 13 is a schematic diagram illustrating a logic synthesis process for designing a SUM gate of a balanced ternary half adder according to an example embodiment.

FIG. 13 is a schematic diagram illustrating a logic synthesis process for designing a SUM gate of a balanced ternary half adder according to an example embodiment.

FIG. 13 schematically illustrates a process of generating a pull-up table and a pull-down table by using a truth table representing a balanced ternary half adder, applying a modified Queen McCluskey algorithm, selecting an optimized SOP, and mapping a suitable transistor.

A pull-up/pull-down table generating operation may be an operation of generating a pull-up/pull-down table from a ternary truth table of a ternary logic. A ternary logic gate may have four networks, and the networks may perform different switching operations. Thus, a pull-up or pull-down table may be required for each network. Each table may include an input end and an output end. The input end may include all possible variable combinations, and may be the same as an input end of the truth table. When the number of variables is n, $3^n$ input combinations may be generated. The output end may include turn-on (ON) or turn-off (OFF), which may represent a turn-on/turn-off switching operation of a network with respect to a corresponding input combination.

For example, when a current flows in a network with respect to a particular input combination, a switch of the network may be turn-on and an output thereof may be turn-on. Specifically, if an output of a pull-up table of a drain-ground path is turn-on when an input variable A is logic −1 and an input variable B is logic 1, a current may flow in a pull-up network of the drain-ground path with respect to the corresponding input combination.

Depending on switching operations of pull-up/pull-down networks to be generated from the truth table, four pull-up/pull-down tables may be obtained.

According to an example embodiment, with respect to the pull-up table of the drain-ground path, an output of the pull-up table may be ON when an output of the truth table is logic 1, and may be OFF in the other case.

In another embodiment, with respect to the pull-down table of the drain-ground path, an output of the pull-down table may be turn-on when the output of the truth table is logic −1, and the output may be turn-off in the other case.

In still another embodiment, with respect to the pull-up table of the half-drain path, an output of the pull-up table may be turn-on when the output of the truth table is logic 0, and the output of the pull-up table may be a don't care term when the output of the truth table is logic 1. The part may represent that a corresponding input combination has no effect on a switch operation of a network. The output of the pull-up table may be turn-off in the other case, that is, when the output of the truth table is logic −1.

Last, with respect to the pull-down table of the half-drain path, an output of the pull-down table may be a don't-care term when the output of the truth table is logic 1, may be turn-on when the output of the truth table is logic 0, and may be turn-off when the output of the truth table is logic −1.

Table 5 below illustrates pull-up/pull-down tables generated from a truth table provided with respect to a 2-input ternary SUM gate.

TABLE 5

| A | B | Y | VDD/Gnd Up | VDD/Gnd Down | Half-VDD Up | Half-VDD Down |
|---|---|---|---|---|---|---|
| − | − | + | ON | OFF | X | OFF |
| − | 0 | − | OFF | ON | OFF | X |
| − | + | 0 | OFF | OFF | ON | ON |
| 0 | − | − | OFF | ON | OFF | X |
| 0 | 0 | 0 | OFF | OFF | ON | ON |
| 0 | + | + | ON | OFF | X | OFF |
| + | − | 0 | OFF | OFF | ON | ON |
| + | 0 | + | ON | OFF | X | OFF |
| + | + | − | OFF | ON | OFF | X |
| − | − | + | ON | OFF | X | OFF |
| − | 0 | − | OFF | ON | OFF | X |
| − | + | 0 | OFF | OFF | ON | ON |
| 0 | − | − | OFF | ON | OFF | X |
| 0 | 0 | 0 | OFF | OFF | ON | ON |
| 0 | + | + | ON | OFF | X | OFF |
| + | − | 0 | OFF | OFF | ON | ON |
| + | 0 | + | ON | OFF | X | OFF |
| + | + | − | OFF | ON | OFF | X |

Minimization for designing a ternary logic circuit with the minimum number of transistors may be performed by using the generated pull-up/pull-down tables. However, before the minimization, don't-care terms (parts marked with X) in the pull-up/pull-down table of the half-drain path may need to be processed. Each of the don't care terms may be replaced with ON or OFF.

In order to optimally synthesize a circuit with respect to an arbitrary truth table, all combinations which substitute don't-care terms with ON or OFF may need to be considered. Accordingly, with respect to the pull-up/pull-down table of the half-drain path, all possible pull-up/pull-down tables including only ON or OFF may be generated. The pull-up/pull-down tables may be all optimized through a proposed minimization algorithm, and a (ON or OFF) combination for a single don't-care term having the minimum number of transistors may be selected. Table 6 below illustrates pull-up/pull-down tables in which don't-care terms are processed so as to have a smallest transistor count with respect to the 2-input ternary SUM gate.

TABLE 6

| A | B | Y | VDD/Gnd Up | VDD/Gnd Down | Half-VDD Up | Half-VDD Down |
|---|---|---|---|---|---|---|
| − | − | + | ON | OFF | OFF | OFF |
| − | 0 | − | OFF | ON | OFF | ON |
| − | + | 0 | OFF | OFF | ON | ON |
| 0 | − | − | OFF | ON | OFF | ON |
| 0 | 0 | 0 | OFF | OFF | ON | ON |
| 0 | + | + | ON | OFF | ON | OFF |
| + | − | 0 | OFF | OFF | ON | ON |
| + | 0 | + | ON | OFF | ON | OFF |
| + | + | − | OFF | ON | OFF | OFF |

Next, in the Quine-McCluskey applying operation, illustratively yet not limited, the minimization may be performed by using a modified Quine-McCluskey algorithm.

An objective of the modified Quine-McCluskey algorithm is to convert a provided minterm canonical expression into an SOP expression having the minimum number of transistors. An implicant Impi may be defined as a product term which covers at least one minterm, and a prime implicant PrImpi may be defined as a product term that may not be combined with another implicant any further.

The modified Quine-McCluskey algorithm may be divided into two operations, which are described in detail below.

A first operation may be an operation of finding all prime implicants by repetitively combining implicants. Minterms may be extracted from generated pull-up/pull-down tables. The extracted minterms may be input combinations corresponding to parts of the pull-up/pull-down tables in which an output is ON. The minterms may be set to initial values of the implicants. When the implicants are generated, the implicants may be classified into groups according to the number of 0 and the number of + when represented with trit expressions. For example, a prime implicant $A_0B+$ may have one 0 and one +, and accordingly may be classified as a group [1, 1]. After the grouping is performed, whether each implicant may be combined with another adjacent implicant is verified. When a group of a particular implicant is [x, y], groups adjacent to the group may be groups [x−1, y], [x+1, y], [x, y−1], [x, y+1], [x−1, y+1], and [x+1, y−1]. Two different implicants having an adjacent group and having a difference only in terms of a single trit may be combined. All combined implicants may be stored in $Imp_{mrg}$. After the repetitive merging process, implicants that may not be combined any further may be stored in PrImp, and the repetition may be performed until there are no further implicants that may be combined.

In a second operation, SOPs may be obtained by using a sum of suprime implicants. A prime implicant (PI) chart may be configured with the prime implicants obtained in the first operation. Columns of the PI chart may be expressed with a decimal number of a minterm, and rows thereof may be configured with the generated prime implicants. The prime implicant may be a reduced product term including at least one minterm. In the PI chart, an asterisk may be placed at an intersection between the prime implicants and a minterm covered by the prime implicants. When a single asterisk is present in a column, a corresponding minterm may be covered by only one prime implicant. In this case, the prime implicant may be essential for a provided ternary function. After all essential prime implicants are obtained, a combination of nonessential prime implicants that may cover all the remaining uncovered minterms may be searched. Last, an SOP may be obtained by combining the essential prime implicants and the required nonessential prime implicants.

Tables 7 to 10 illustrate processes of minimization using the modified Quine-McCluskey algorithm with respect to the 2-input ternary SUM gate.

TABLE 7

| | Implicant | | | Group | |
|---|---|---|---|---|---|
| | $A_-B_-$ | | | [0, 0] | |
| | $A_0B_+$ | | | [1, 1] | |
| | $A_+B_0$ | | | [1, 1] | |
| | 0 | | 5 | | 7 |
| $A_-B_-$ | * | | | | |
| $A_0B_+$ | | | * | | |
| $A_+B_0$ | | | | | * |

$U_{0/2} = A_-B_- + A_0B_+ + A_+B_0$

TABLE 8

| Implicant | Group | | | |
|---|---|---|---|---|
| $A_-B_0$ | [0, 0] | | | |
| $A_0B_-$ | [1, 1] | | | |
| $A_+B_+$ | [1, 1] | | | |
|  | 1 | 3 | 8 | |
| $A_-B_0$ | * | | | |
| $A_0B_-$ |  | * | | |
| $A_+B_+$ |  |  | * | |

$D_{0/2} = A_-B_0 + A_0B_- + A_+B_+$

TABLE 9

| Implicant | Group | | | | |
|---|---|---|---|---|---|
| $A_-B_-$ | [0, 1] | | | | |
| $A_0B_0$ | [2, 0] | | | | |
| $A_0B_+$ | [1, 1] | | | | |
| $A_+B_-$ | [0, 1] | | | | |
| $A_+B_0$ | [1, 1] | | | | |
| $(A_- + A_0)B_+$ | [0, 1] | | | | |
| $A_0(B_0 + B_+)$ | [2, 1] | | | | |
| $A_+(B_- + B_0)$ | [1, 1] | | | | |
|  | 2 | 4 | 5 | 6 | 7 |
| $(A_- + A_0)B_+$ | * |  | * |  |  |
| $A_0(B_0 + B_+)$ |  | * | * |  |  |
| $A_+(B_- + B_0)$ |  |  |  | * | * |

$U_1 = (A_- + A_0)B_+ + A_0(B_0 + B_+) + A_+(B_- + B_0)$

TABLE 10

| Implicant | Group | | | | |
|---|---|---|---|---|---|
| $A_-B_0$ | [1, 0] | | | | |
| $A_-B_+$ | [0, 1] | | | | |
| $A_0B_-$ | [1, 0] | | | | |
| $A_0B_0$ | [2, 0] | | | | |
| $A_+B_-$ | [0, 1] | | | | |
| $A_-(B_0 + B_+)$ | [1, 0] | | | | |
| $(A_- + A_0)B_0$ | [1, 0] | | | | |
| $(A_0 + A_+)B_-$ | [1, 1] | | | | |
|  | 1 | 2 | 3 | 4 | 6 |
| $A_-(B_0 + B_+)$ | * | * |  |  |  |
| $(A_- + A_0)B_0$ | * |  |  | * |  |
| $(A_0 + A_+)B_-$ |  |  | * |  | * |

$D_1 = A_-(B_0 + B_+) + (A_- + A_0)B_0 + (A_0 + A_+)B_-$

After minimization is performed when the pull-up/pull-down tables of Table 6 are inputted as an input of the algorithm, SOPs for the pull-up/pull-down networks of the drain-ground path may be $A_-B_- + A_0B_+ + A_+B_0$ and $A_-B_0 + A_0B_- + A_+B_+$, and SOPs for the pull-up/pull-down networks of the half-drain path may be $(A_- + A_0)B_+ + A_0(B_0+B_+)+A_+(B_-+B_0)$ and $A_-(B_0+B_+)+(A_-+A_0)B_0+(A_0+A_+)B_-$.

The SOP optimizing operation may be an operation of selecting a most optimal SOP when a plurality of minimized SOPs are generated with the modified Quine-McCluskey algorithm. In the SOP optimizing operation, the optimal SOP may be determined in consideration of two factors.

First, a network may need to have a smallest transistor count. Second, a transmission delay of the network may need to be minimized. A logic gate may be configured to reduce the transmission delay by minimizing the number of CNTFETs having a chirality vector (8,0).

Specifically, it is assumed that a particular SOP is an optimal SOP (OSOP). Then, in order to verify whether the particular SOP is the optimal SOP, all remaining SOPs excluding the particular SOP may be compared to the OSOP. With respect to all the SOPs, a transistor count required to configure a network for each SOP may be calculated.

The transistor count calculated for each SOP may be compared to a transistor count of the OSOP. Based on a comparison result, an SOP requiring a fewer number of transistors may be determined as the OSOP. When a transistor count of a current OSOP is less than a transistor count required for an SOP compared thereto, the current OSOP may be maintained as the OSOP. By selecting an SOP requiring fewer transistors as the OSOP, it is possible to reduce a power consumption and a required area of a circuit, and to maximize a speed of the circuit.

Next, when the required transistor counts are the same, the transmission delay of the circuit may be reduced by reducing the number of CNTFETs having a chirality vector (8, 0). When configuring a network, two types of CNTFETs having chirality vectors of (8, 0) and (17, 0) may be used. A CNTFET having a chirality vector of (13, 0) may be used to configure a first pass transistor and a second pass transistor.

A chirality vector may be inversely proportional to a threshold voltage of a CNTFET. Thus, a threshold voltage of the CNTFET having the chirality vector of (8, 0) may be greater than a threshold voltage of the CNTFET having the chirality vector of (17, 0). Thus, a lower drain current may flow in the CNTFET having the chirality vector of (8, 0).

As a result, the transmission delay of the logic gate may increase as the drain current decreases. Thus, when networks are configured with the same number of transistors, the transmission delay may be reduced by reducing the number of CNTFETs having the chirality vector of (8, 0).

The transistor mapping operation may be an operation of configuring networks by connecting suitable devices together with the static gate design after the SOP optimizing operation.

With respect to each product term of an SOP, two transistors may be connected in series by connecting a drain node of a particular transistor and a source node of a subsequent transistor. In a similar manner, the SOP may be configured by connecting generated product models in parallel. In a pull-up network, the product models may be connected in parallel by connecting source nodes of top transistors of the product models and connecting drain nodes of bottom transistors of the product models.

Last, the logic gate may be synthesized by suitably connecting nodes of the networks as illustrated in FIG. 3. According to the ternary logic synthesis method according to an example embodiment, a ternary logic circuit may be synthesized with the minimum number of transistors, and the transmission delay of the logic gate may be reduced. The ternary logic synthesis method according to an example embodiment has been described exemplarily by using the unbalanced ternary logic, but may be also applied to the balanced ternary logic in the same manner.

Performance of Synthesized Ternary Logic Circuit

Figure 14:
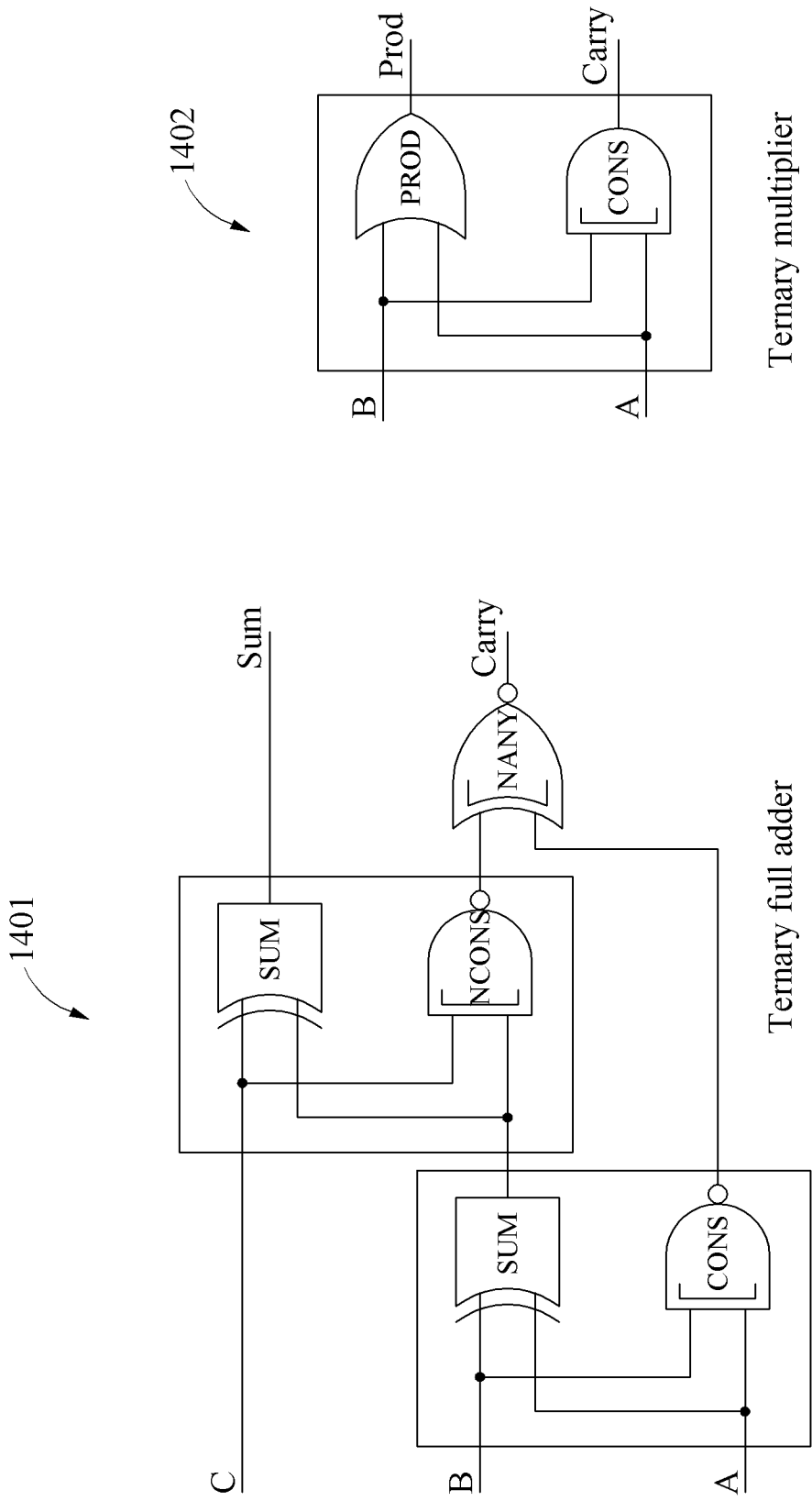
FIG. 14 illustrates gate design diagrams of ternary arithmetic logic circuits.

FIG. 14 illustrates gate design diagrams of ternary arithmetic logic circuits.

A design diagram 1401 may represent gate design diagrams of an unbalanced ternary full adder and a balanced ternary full adder, and a design diagram 1402 may represent a gate design diagram of an unbalanced ternary multiplier. The balanced ternary multiplier may have a single output, and thus may be designed as a single logic gate. A ternary full adder and a ternary multiplier may be generated by mapping a transistor based on the gate design diagrams of the ternary arithmetic logic circuits illustrated in FIG. 14.

Figure 15:
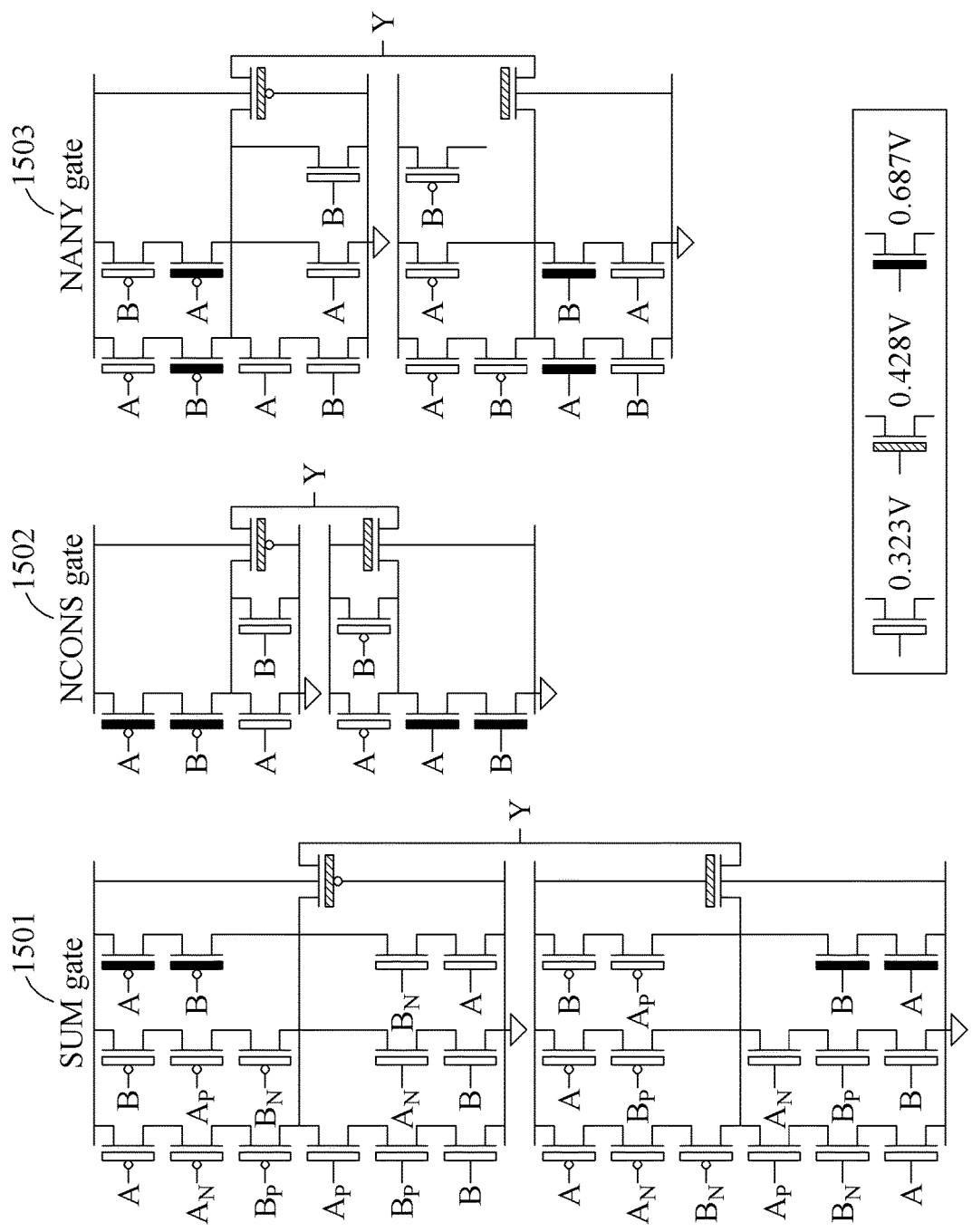
FIG. 15 illustrates examples of a pass transistor-based static gate according to an example embodiment in a balanced ternary logic.

FIG. 15 illustrates examples of a pass transistor-based static gate according to an example embodiment in a balanced ternary logic.

A gate 1501 may represent a pass transistor-based SUM gate according to an example embodiment, a gate 1502 may represent a pass transistor-based NCONS gate according to an example embodiment, and a gate 1503 may represent a pass transistor-based NANY according to an example embodiment. Referring to the design diagram 1401 of FIG. 14, the balanced ternary full adder may include two half adders and one NANY gate. One half adder may include one SUM gate and one NCONS gate. Referring to the gate 1501, a transistor count used for the SUM gate may be 32, and 8 transistors may be additionally used for NTI and PTI. A transistor count of the NCONS gate may be 10, and a transistor count of the NANY gate may be 18. Thus, in the balanced ternary logic, a transistor count may be 50 in the balanced ternary half adder, and may be 118 in the ternary full adder.

Figure 16:
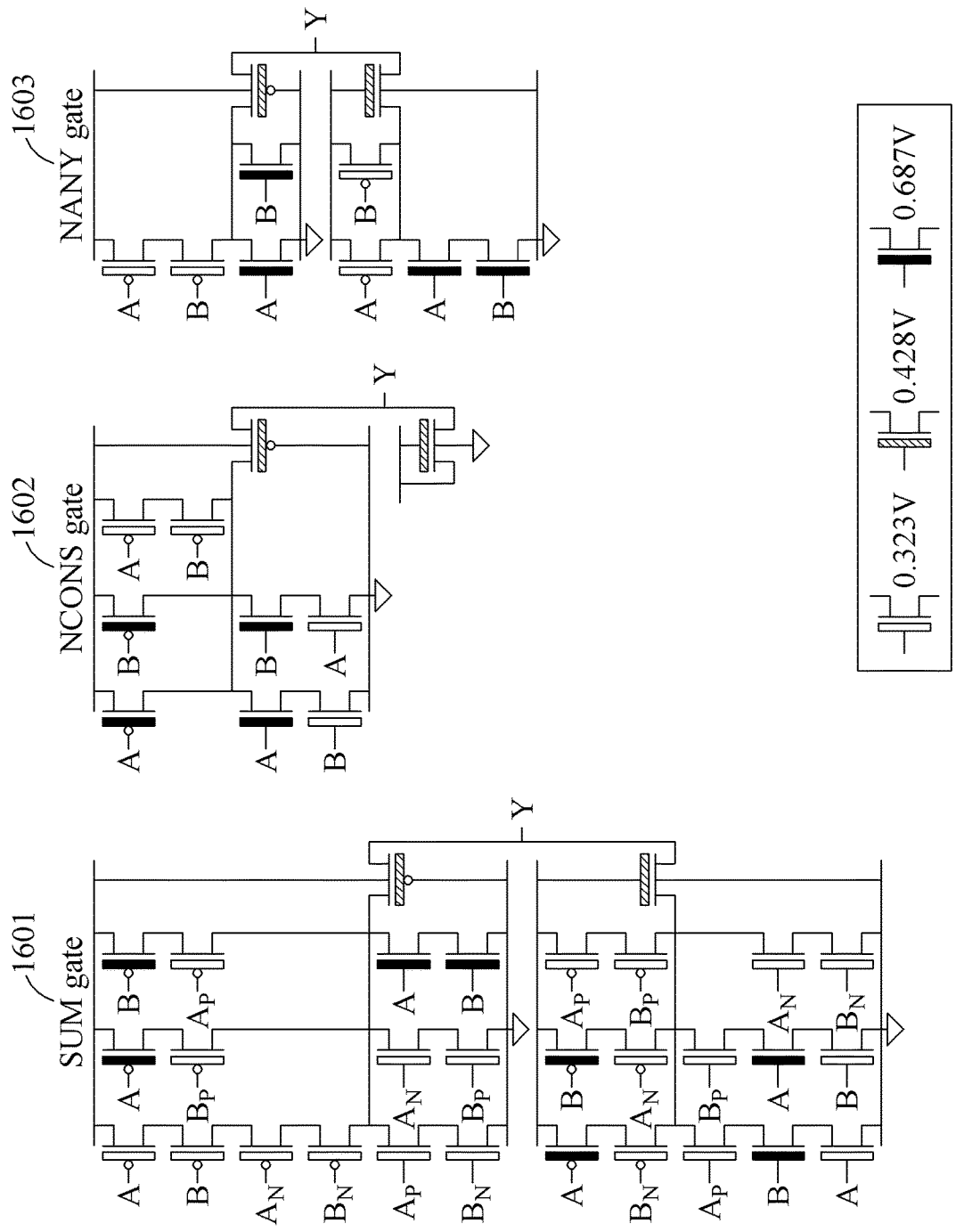
FIG. 16 illustrates examples of a pass transistor-based static gate according to an example embodiment in an unbalanced ternary logic.

FIG. 16 illustrates examples of a pass transistor-based static gate according to an example embodiment in an unbalanced ternary logic.

A gate 1601 may represent a pass transistor-based SUM gate according to an example embodiment, a gate 1602 may represent a pass transistor-based NCONS gate according to an example embodiment, and a gate 1603 may a pass transistor-based NANY according to an example embodiment. Referring to the design diagram 1401 of FIG. 14, the unbalanced ternary full adder may include two half adders and one NANY gate. Referring to the gate 1601, a transistor count used for the SUM gate may be 30, and 8 transistors may be additionally used for NTI and PTI. A transistor count of the NCONS gate may be 10, and a transistor count of the NANY gate may be 10. Thus, in the unbalanced ternary logic, a transistor count may be 48 in the unbalanced ternary half adder, and may be 106 in the ternary full adder.

Truth tables of the synthesized ternary logic gates are illustrated in Tables 11 and 12 below. Table 11 illustrates a truth table of a 2-input logic gate of the balanced ternary logic, and Table 12 illustrates a truth table of a 2-input logic gate of the unbalanced ternary logic.

TABLE 11

| Input | | Half Adder and Full Adder | | | | Multiplier |
|---|---|---|---|---|---|---|
| A | B | SUM | CONS | NCONS | NANY | PROD |
| − | − | + | − | + | + | + |
| − | 0 | − | 0 | 0 | + | 0 |
| − | + | 0 | 0 | 0 | 0 | − |
| 0 | − | − | 0 | 0 | + | 0 |
| 0 | 0 | 0 | 0 | 0 | 0 | 0 |
| 0 | + | + | 0 | 0 | − | 0 |
| + | − | 0 | 0 | 0 | 0 | − |
| + | 0 | + | 0 | 0 | − | 0 |
| + | + | − | + | − | − | + |

TABLE 12

| Input | | Half Adder and Full Adder | | | | Multiplier | |
|---|---|---|---|---|---|---|---|
| A | B | SUM | CONS | NCONS | NANY | PROD | CARRY |
| 0 | 0 | 0 | 0 | 2 | 2 | 0 | 0 |
| 0 | 1 | 1 | 0 | 2 | 2 | 0 | 0 |
| 0 | 2 | 2 | 0 | 2 | 1 | 0 | 0 |
| 1 | 0 | 1 | 0 | 2 | 2 | 0 | 0 |
| 1 | 1 | 2 | 0 | 2 | 2 | 1 | 0 |
| 1 | 2 | 0 | 1 | 1 | 1 | 2 | 0 |
| 2 | 0 | 2 | 0 | 2 | 1 | 0 | 0 |
| 2 | 1 | 0 | 1 | 1 | 1 | 2 | 0 |
| 2 | 2 | 1 | 1 | 1 | 0 | 1 | 1 |

Figure 17A:
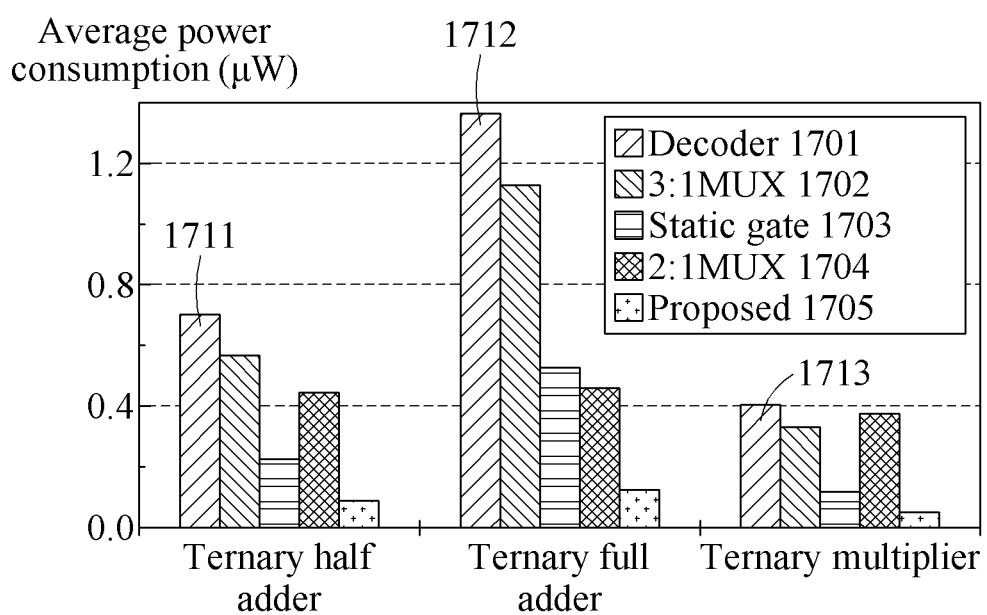
FIG. 17A illustrates average power consumptions of a conventional static gate and a static gate according to an example embodiment in an unbalanced arithmetic logic circuit.
Figure 17B:
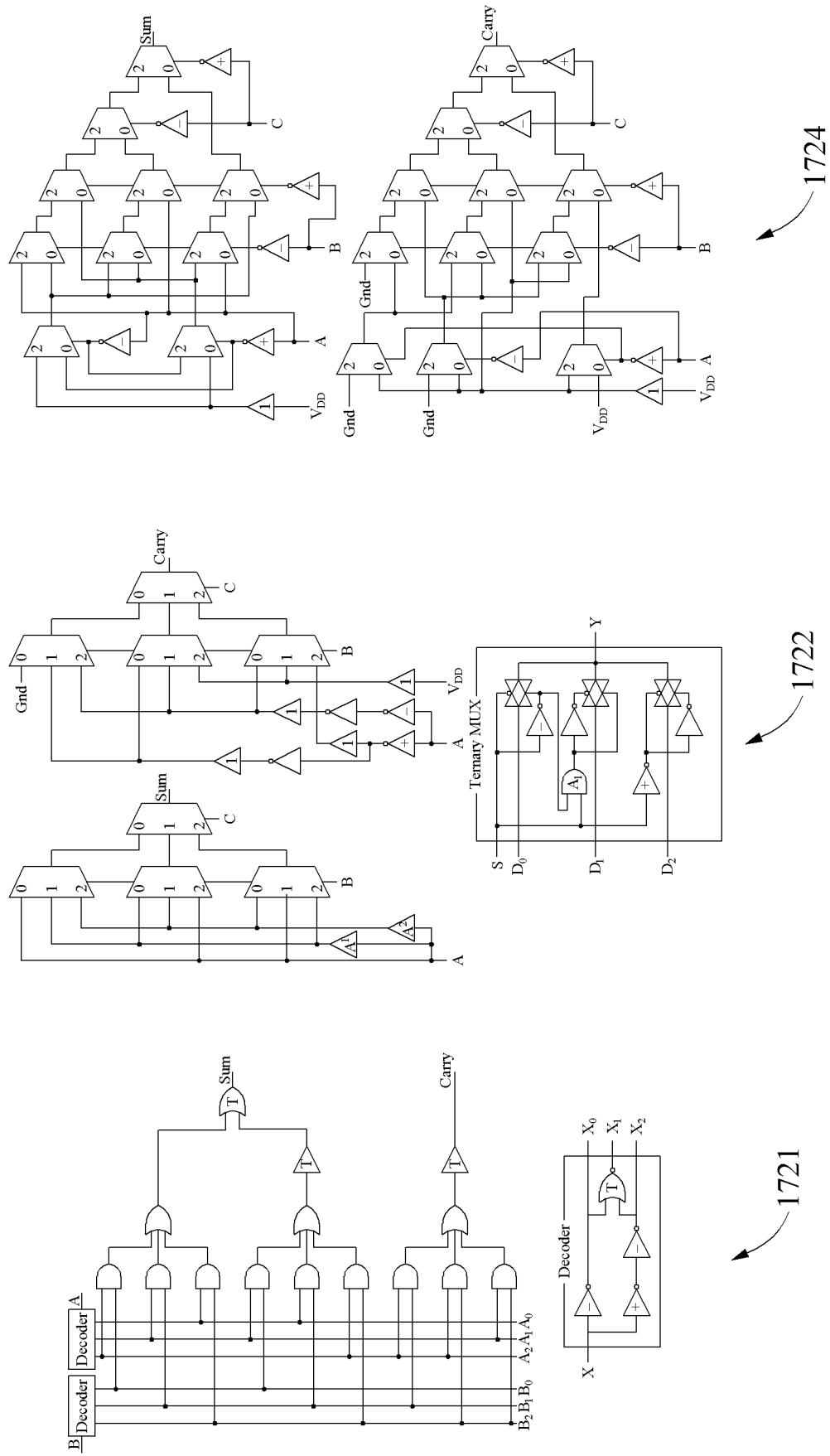
FIG. 17B illustrates an example of a conventional ternary logic circuit.

FIG. 17A illustrates average power consumptions of a conventional static gate and a static gate according to an example embodiment in an unbalanced arithmetic logic circuit, and FIG. 17B illustrates an example of a conventional ternary logic circuit.

A graph 1701 may represent an average power consumption when a ternary logic circuit is designed based on a decoder. Referring to FIG. 17B, a gate 1721 may represent a conventional decoder-based ternary half adder. For example, a bar graph 1711 may represent an average power consumption when a ternary half adder is designed based on a decoder, a bar graph 1712 is an average power consumption when a ternary full adder is designed based on a decoder, and a bar graph 1713 may represent an average power consumption when a ternary multiplier is designed based on the decoder.

The graph 1702 may represent an average power consumption when a ternary logic circuit is designed based on a 3:1 multiplexer. Referring to FIG. 17B, a gate 1722 may represent a conventional 3:1 multiplexer-based ternary full adder.

A graph 1703 may represent an average power consumption when a ternary logic circuit is designed based on a diode-connected transistor.

A graph 1704 may represent an average power consumption when a 2:1 multiplexer-based ternary logic circuit is designed. Referring to FIG. 17B, a gate 1724 may represent a conventional 2:1 multiplexer-based ternary full adder.

A graph 1705 may represent an average power consumption when a ternary logic circuit is designed based on a pass transistor according to an example embodiment. In comparison to the average power consumption when the ternary logic circuit is designed based on the 2:1 multiplexer, the average power consumptions of the ternary half adder, the ternary full adder, and the ternary multiplier when the ternary logic circuit is designed based on the pass transistor according to an example embodiment may be respectively improved by 81.12%, 72.35%, and 86.02%, which indicates that it is possible to effectively reduce static power according to an example embodiment.

Table 13 below illustrates a comparison of characteristics of various designs of a ternary full adder, a half adder, and a multiplier.

TABLE 13

| Condition | Transistor Count | Average Power Consumption (µW) | Worst Delay (ns) | Power-Delay Product (fJ) |
|---|---|---|---|---|
| Ternary Half Adder | | | | |
| Decoder | 88 | 0.703 | 0.072 | 0.050 |
| 3:1 MUX | 58 | 0.569 | 0.052 | 0.030 |
| Static Gate | 48 | 0.229 | 0.061 | 0.014 |
| 2:1 MUS | 38 | 0.445 | 0.087 | 0.039 |
| Proposed | 48 | 0.084 | 0.135 | 0.011 |

TABLE 13-continued

| Condition | Transistor Count | Average Power Consumption (μW) | Worst Delay (ns) | Power-Delay Product (fJ) |
|---|---|---|---|---|
| Ternary Full Adder | | | | |
| Decoder | 318 | 1.363 | 0.088 | 0.120 |
| 3:1 MUX | 105 | 1.129 | 0.068 | 0.076 |
| Static Gate | 106 | 0.527 | 0.131 | 0.069 |
| 2:1 MUX | 98 | 0.463 | 0.123 | 0.057 |
| Proposed | 106 | 0.128 | 0.269 | 0.034 |
| Ternary Multiplier | | | | |
| Decoder | 66 | 0.408 | 0.060 | 0.024 |
| 3:1 MUX | 43 | 0.336 | 0.042 | 0.014 |
| Static Gate | 30 | 0.124 | 0.026 | 0.003 |
| 2:1 MUX | 32 | 0.379 | 0.027 | 0.010 |
| Proposed | 30 | 0.053 | 0.057 | 0.003 |

Table 13 illustrates a comparison of characteristics of designs in terms of a transistor count, an average power consumption, a worst delay, and a PDP. The number of logic gates required when designing a pass transistor-based ternary logic circuit according to an example embodiment may be reduced in comparison to those required when designing a decoder-based ternary logic circuit using only conventional static logic gates STI, NMIN, and NMAX. When a pass transistor-based ternary logic circuit according to an example embodiment is designed, a ternary half adder may have an average power consumption of 0.084 uW, a worst delay of 0.135 ns, and a PDP of 0.011 fJ. A PDP of a pass transistor-based ternary half-adder according to an example embodiment may be determined by an SUM gate using the largest number of transistors, however, a power consumption of the pass transistor-based ternary half-adder may be greatly reduced to reduce a worst delay thereof by 21.43% in comparison to that of the diode-connected transistor-based ternary logic circuit.

A pass transistor-based ternary full adder according to an example embodiment may have an average power consumption of 0.128 uW, a worst of 0.269 ns, and a PDP of 0.034 fJ. The worst delay of the pass transistor-based ternary full adder according to an example embodiment may be about twice that of the pass transistor-based ternary half adder, because two SUM gates are included in a critical path. In the diode-connected transistor-based ternary logic circuit, static power may be dominant in the power consumption, and the average power consumption of the ternary full adder may be more than twice that of the ternary half adder. However, in the pass transistor-based ternary logic circuit according to an example embodiment, dynamic power may be dominant in the power consumption, and the average power consumption of the ternary full adder may be less than twice (about 1.5 times) of the ternary half adder. The PDP of the pass transistor-based ternary full adder according to an example embodiment may be improved by 50.72% in comparison to the diode-connected transistor-based ternary logic circuit. In comparison to the 2:1 multiplexer-based ternary full adder, the pass transistor-based ternary full adder may consume less power on average despite the use of more transistors. The PDP of the pass transistor-based ternary full adder may be respectively improved by 55.26% and 40.35% in comparison to the 3:1 multiplexer-based ternary full adder and the 2:1 multiplexer-based ternary full adder. Designs of the 3:1 multiplexer-based ternary logic circuit and the 2:1 multiplexer-based ternary logic circuit may be based on a multiplexer, and the pass transistor-based static gate may have higher energy efficiency in comparison to a multiplexer-based transfer gate.

A transistor count of a pass transistor-based ternary multiplier may be 30, and the pass transistor-based ternary multiplier may have an average power consumption of 0.053 uW, a worst delay of 0.057 ns, and a PDP of 0.003 fJ. In the same manner as a previous tendency, the pass transistor-based ternary multiplier may have the highest energy efficiency with the lowest power consumption. The pass transistor-based ternary multiplier may consume less power on average while having a greater worst delay in comparison to the diode-connected transistor based ternary logic circuit.

Figure 18:
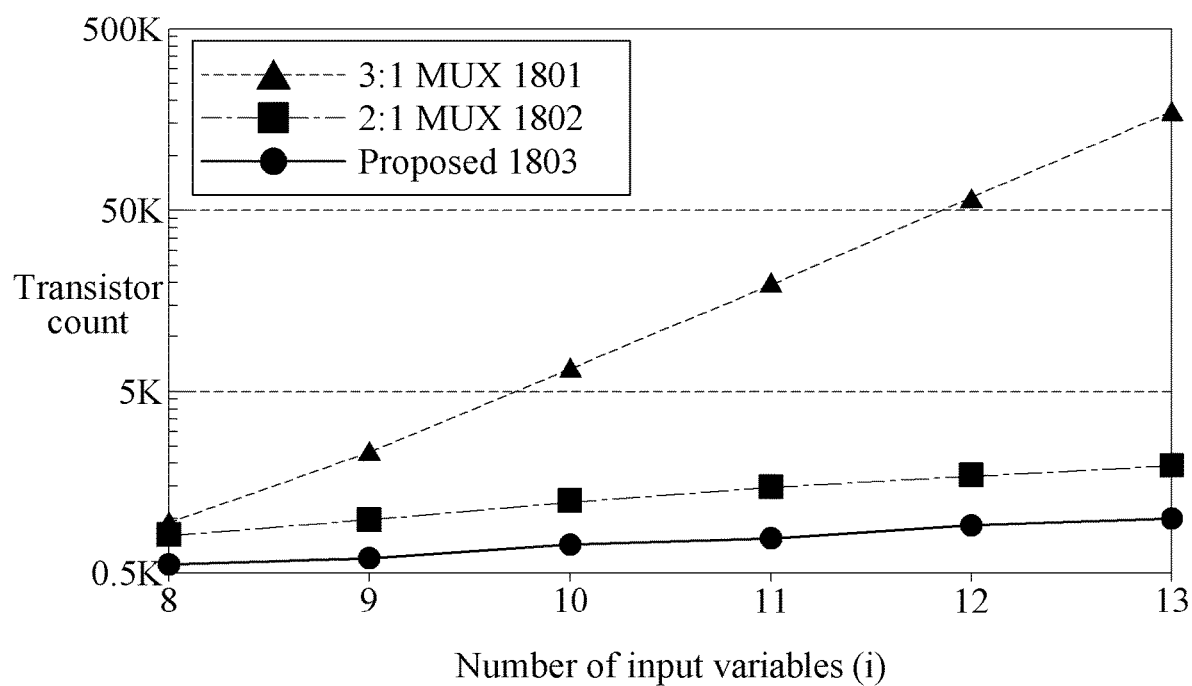
FIG. 18 illustrates a transistor count varying according to the number of input variables.

FIG. 18 illustrates a transistor count varying according to the number of input variables.

A graph 1801 may represent a transistor count when a 3:1 multiplexer-based ternary logic circuit is designed, and a graph 1802 may represent a transistor count when a 2:1 multiplexer-based ternary logic circuit is designed. A graph 1803 may represent a transistor count when a pass transistor-based ternary logic circuit according to an example embodiment is designed. Illustratively yet not limited, FIG. 18 illustrates a transistor count used in each sum circuit in a log scale when a $sum_i$ logic circuit adding i ternary input variables is synthesized. $sum_i$ may be defined by Equation 2 below.

$$sum_i = \sum_{m=0}^{i-1} x_m \qquad \text{[Equation 2]}$$

When the 2:1 multiplexer-based ternary logic circuit is designed, an increase in the transistor count may be reduced to a certain degree. However, when the pass transistor-based triplet logic circuit according to an example embodiment is designed, the transistor count may be minimized.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A static ternary gate comprising:
a drain-ground path configured to output a drain voltage through a first transistor when a first pull-up circuit is turned on, and output a ground voltage through a second transistor when a first pull-down circuit is turned on;
a half-drain path configured to output a half-drain voltage through the first transistor and the second transistor when both a second pull-up circuit and a second pull-down circuit are turned on,
wherein the first transistor is configured to connect a first node between the first pull-up circuit and the second pull-down circuit to an output terminal, and
the second transistor is configured to connect a second node between the second pull-up circuit and the first pull-down circuit to the output terminal, and
wherein, when an output voltage of the output terminal decreases from a drain voltage to a half-drain voltage, the second pull-down circuit is turned on, so that a voltage of the first node is transitioned from a drain voltage to a ground voltage, and the output voltage is maintained at a half-drain voltage by turning off the first transistor connected to the first node, and
when the output voltage of the output terminal increases from a ground voltage to a half-drain voltage, the second pull-up circuit is turned on, so that a voltage of the second node is transitioned from a ground voltage to a drain voltage, and the output voltage is maintained at a half-drain voltage by turning off the second transistor connected to the second node.

2. The static ternary gate of claim 1, wherein
the first pull-up circuit is configured to connect the second pull-down circuit, a drain power supply configured to supply the drain voltage, and the first transistor, and
the first pull-down circuit is configured to connect the second pull-up circuit, a ground configured to supply the ground voltage, and the second transistor.

3. The static ternary gate of claim 1, wherein
the second pull-up circuit is configured to connect the first pull-down circuit, a drain power supply configured to supply the drain voltage, and the second transistor, and
the second pull-down circuit is configured to connect the first pull-up circuit, a ground configured to supply the ground voltage, and the first transistor.

4. The static ternary gate of claim 1, wherein
the first pull-up circuit and the second pull-up circuit comprise a transistor having a same doping type as that of the first transistor,
the first pull-down circuit and the second pull-down circuit comprise a transistor having a same doping type as that of the second transistor, and
the first transistor and the second transistor have opposite doping types.

5. The static ternary gate of claim 1, wherein the first transistor is a p-type transistor, and the second transistor is an n-type transistor.

6. The static ternary gate of claim 1, the first transistor and the second transistor are a single-walled carbon nanotube field effect transistor (CNTFET).

7. The static ternary gate of claim 1, wherein
the first pull-up circuit, the first pull-down circuit, the second pull-down circuit, and the second pull-down circuit comprise a transistor having a first threshold voltage less than a half-drain voltage and a transistor having a second threshold voltage greater than or equal to the half-drain voltage, and
the first transistor and the second transistor are transistors having a third threshold voltage between the first threshold voltage and the second threshold voltage.

8. The static ternary gate of claim 1, wherein, when both the second pull-up circuit and the second pull-down circuit are turned on and the output terminal outputs a half-drain accordingly, both the first transistor and the second transistor are turned off to maintain an output of a half-drain voltage.

9. The static ternary gate of claim 1, wherein, when the output voltage decreases from a drain voltage to a half-drain voltage, the first transistor is turned off when a voltage of the first node becomes less than or equal to a threshold voltage.

10. The static ternary gate of claim 1, wherein, when the output voltage of the output terminal increases from the ground voltage to the half-drain voltage, the second transistor is turned off when the voltage of the second node becomes greater than or equal to a voltage obtained by subtracting a threshold voltage from the drain voltage of the second node.

11. The static ternary gate of claim 1, wherein a body of the first transistor is connected to a drain power supply configured to supply a drain voltage, and a body of the second transistor is connected to a ground configured to supply a ground voltage.

12. The static ternary gate of claim 1, further comprising:
an external power supply connected to the output terminal,
wherein, in response to a decrease in a voltage of the output terminal caused by the external power supply, a first current flowing through the first transistor decreases and a second current flowing through the second transistor increases, and
in response to an increase in the voltage of the output terminal caused by the external power supply, the first current flowing through the first transistor increases and the second current flowing through the second transistor decreases.

* * * * *